(12) United States Patent
Nystad et al.

(10) Patent No.: US 9,865,084 B2
(45) Date of Patent: *Jan. 9, 2018

(54) GRAPHICS PROCESSING USING ATTRIBUTES WITH ASSOCIATED META INFORMATION

(71) Applicant: ARM LIMITED, Cambridge (GB)

(72) Inventors: Jorn Nystad, Trondheim (NO); Aske Simon Christensen, Aarhus (DK)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,944

(22) Filed: Jan. 26, 2015

(65) Prior Publication Data

US 2015/0193969 A1 Jul. 9, 2015

Related U.S. Application Data

(63) Continuation of application No. 13/406,882, filed on Feb. 28, 2012, now Pat. No. 8,976,177.

(30) Foreign Application Priority Data

Mar. 3, 2011 (GB) .................................. 1103699.3

(51) Int. Cl.
G06T 15/80 (2011.01)
G06T 15/00 (2011.01)
G06T 1/20 (2006.01)

(52) U.S. Cl.
CPC ............. *G06T 15/80* (2013.01); *G06T 1/20* (2013.01); *G06T 15/005* (2013.01); *G06T 2200/04* (2013.01)

(58) Field of Classification Search
None
See application file for complete search history.

(56) References Cited

U.S. PATENT DOCUMENTS 5,757,321 A 5/1998 Billyard
6,417,858 B1 7/2002 Bosch et al.
(Continued)

FOREIGN PATENT DOCUMENTS

CN 1529288 A 9/2004
JP 2010535393 A 11/2010
(Continued)

OTHER PUBLICATIONS

McMains et al., "Out-of-Core Build of a Topological Data Structure from Polygon Soup," ACM, 2001.*
(Continued)

*Primary Examiner* — Nicholas R Wilson
(74) *Attorney, Agent, or Firm* — Vierra Magen Marcus LLP

(57) ABSTRACT

A graphics processor includes a vertex shader 20 that processes input attribute values from a vertex buffer 26 to generate output vertex shaded attribute values 28 to be used by a rasterizer/fragment shader 22 of the graphics processor when processing an image for display. Vertex shader output attributes for which the vertex shader input attributes that the vertex shader output attribute depends on are defined solely on a per-vertex basis or solely on a per-instance basis are identified. Then, for such vertex shader output attributes, the vertex shader 20 stores, for use by the rasterizer/fragment shader 22 of the graphics processor when processing an image for display, only one copy of the vertex shader output attribute for a given vertex or instance, respectively, irrespective of the number of instances or vertices, respectively, that the output attribute value applies to.

17 Claims, 8 Drawing Sheets

(56) References Cited

U.S. PATENT DOCUMENTS

| | | | |
|---|---|---|---|
| 6,624,811 | B1 | 9/2003 | Moreton et al. |
| 6,717,577 | B1 | 4/2004 | Cheng et al. |
| 7,898,543 | B1 | 3/2011 | Bjorke |
| 7,978,197 | B2 | 7/2011 | Boyd et al. |
| 8,558,842 | B1 | 10/2013 | Johnson et al. |
| 8,698,825 | B1 | 4/2014 | Lukka et al. |
| 2004/0135787 | A1 | 7/2004 | Parikh et al. |
| 2005/0122331 | A1 | 6/2005 | Boyd et al. |
| 2005/0162437 | A1 | 7/2005 | Morein et al. |
| 2006/0005178 | A1 | 1/2006 | Kilgard et al. |
| 2006/0044313 | A1 | 3/2006 | Lake et al. |
| 2006/0098019 | A1 | 5/2006 | Tarditi et al. |
| 2006/0176310 | A1 | 8/2006 | Arnaud et al. |
| 2007/0018990 | A1 | 1/2007 | Shreiner |
| 2008/0030512 | A1 | 2/2008 | Jiao et al. |
| 2008/0204451 | A1 | 8/2008 | Im et al. |
| 2009/0033672 | A1 | 2/2009 | Jiao et al. |
| 2009/0073168 | A1 | 3/2009 | Jiao et al. |
| 2009/0189909 | A1 | 7/2009 | Jiao et al. |
| 2010/0141659 | A1 | 6/2010 | Bourd et al. |
| 2010/0208856 | A1 | 8/2010 | Fuchikami et al. |
| 2010/0231588 | A1 | 9/2010 | Barczak |
| 2010/0302246 | A1 | 12/2010 | Jiao et al. |
| 2011/0063294 | A1 | 3/2011 | Brown et al. |
| 2011/0078159 | A1 | 3/2011 | Li et al. |
| 2011/0080406 | A1 | 4/2011 | Hakura et al. |
| 2011/0080415 | A1 | 4/2011 | Duluk et al. |
| 2011/0157195 | A1 | 6/2011 | Sprangle et al. |
| 2012/0081441 | A1 | 4/2012 | Miyake et al. |
| 2012/0223947 | A1 | 9/2012 | Nystad |

FOREIGN PATENT DOCUMENTS

| | | |
|---|---|---|
| JP | 2012185820 A | 9/2012 |
| WO | WO2009/018385 A2 | 2/2009 |

OTHER PUBLICATIONS

UK Search Report dated Jul. 6, 2011, UK Patent Application No. GB1103699.3, 4 pages.

UK Search Report dated Jul. 7, 2011, UK Patent Application No. GB1103698.5, 3 pages.

UK Combined Search Report and Examination Report dated Jun. 27, 2012, UK Patent Application No. GB1203674.5, 5 pages.

Office Action dated Dec. 30, 2013 in U.S. Appl. No. 13/406,882, 58 pages.

Response to Office Action filed May 20, 2014 in U.S. Appl. No. 13/406,882, 24 pages.

Office Action dated Jul. 21, 2014 in U.S. Appl. No. 13/406,882, 18 pages.

Response to Office Action filed Oct. 17, 2014 in U.S. Appl. No. 13/406,882, 10 pages.

Notice of Allowance dated Oct. 27, 2014 in U.S. Appl. No. 13/406,882, 5 pages.

Office Action dated Oct. 1, 2014 in U.S. Appl. No. 13/406,850, 40 pages.

Response to Office Action filed Feb. 2, 2015 in U.S. Appl. No. 13/406,850, 15 pages.

Final Office Action dated Jun. 26, 2015 in U.S. Appl. No. 13/406,850, 40 pages.

Supplemental Response to Office Action filed Feb. 26, 2015 in U.S. Appl. No. 13/406,850, 9 pages.

Office Action dated Dec. 14, 2015, Japanese Patent Application No. 2012-046403.

Amendment filed Sep. 25, 2015, in U.S. Appl. No. 13/406,850, filed Feb. 28, 2012.

Office Action dated Dec. 7, 2015, in U.S. Appl. No. 13/406,850, filed Feb. 28, 2012.

Amendment dated Dec. 22, 2016, in U.S. Appl. No. 13/406,850, filed Feb. 28, 2012.

Office Action dated Feb. 2, 2016, in Chinese Patent Application No. 201210052924.7.

Office Action dated Aug. 26, 2016, in U.S. Appl. No. 13/406,850, filed Feb. 28, 2012.

Amendment dated May 15, 2017, in U.S. Appl. No. 13/406,850, filed Feb. 28, 2012.

Office Action dated Jan. 13, 2017, in U.S. Appl. No. 13/406,850, filed Feb. 28, 2012.

Notice of Allowance dated Jul. 14, 2017, in U.S. Appl. No. 13/406,850, filed Feb. 28, 2012.

Office Action dated Sep. 6, 2017, in Chinese Patent Application No. 201210052926.6.

* cited by examiner

US 9,865,084 B2

GRAPHICS PROCESSING USING ATTRIBUTES WITH ASSOCIATED META INFORMATION

CLAIM OF PRIORITY

This application is a continuation of U.S. patent application Ser. No. 13/406,882, "Graphics Processing," filed on Feb. 28, 2012, which claims priority to UK Application No. 1103699.3, "Graphics Processing," filed on Mar. 3, 2011, both of which are incorporated herein by reference in their entirety.

BACKGROUND

The technology described herein relates to graphics processing and in particular to the operation of graphics processing systems that include a vertex shading stage.

As is known in the art, graphics processing is typically carried out in a pipelined fashion, with one or more pipeline stages operating on the data to generate the final image that is displayed. Two important stages of this process typically are so-called vertex shading operations such as transformations and lighting that are carried out on the vertices of primitives (polygons) representing the image to be displayed, and the subsequent fragment (pixel) shading operations that shade (colour) the individual fragments (pixels) that make up the image to be displayed.

The vertex shading operations, such as vertex transformations and lighting, are typically carried out in a so-called "vertex shader" stage of the graphics process. This is typically a programmable processing unit that executes vertex shader programs on input data values to generate a desired set of output data (e.g. appropriately transformed and lit vertex data) for processing by the rest of the graphics pipeline. (As is known in the art, each primitive (polygon) of a scene is usually defined and represented as a set of vertices, with each vertex having associated with it a set of data values for the vertex. The vertex shading process modifies the initially defined data values for a vertex, e.g. based on any transformations or lighting that the primitive that the vertex relates to is to be subjected to.)

Once the input data values for a scene have been vertex "shaded", the primitives representing the scene are then usually rasterised to generate a plurality of "fragments" to be processed for the scene. (As is known in the art, "fragments" are the discrete graphical entities on which the graphics processing operations (such as rendering) are carried out. Each fragment will correspond to a sampling point or sampling points of the scene and have associated with it the necessary data, such as red, green, blue (RGB) colour values, an alpha (transparency) value, and a depth value, to allow the sample point(s) to be displayed. (Fragments may also be referred to as pixels, although it is not inevitably the case that a given fragment will correspond exactly to a single pixel (pixel element) in the final display, as post-processing, such as down-scaling, may mean that there is not a one-to-one correspondence between the entities (fragments) that the graphics processing operates on and the display pixels.))

The graphics fragments, once generated, undergo a number of processes to shade them to generate their final output colour, etc., values, such as applying textures, blending, etc. Such processes to derive the output data values, etc., e.g. necessary to display the sample point(s) that the fragments represent, may be referred to as "fragment shading" or "pixel shading" and are carried out in a fragment shading (also called a pixel shading) stage of the processing pipeline.

The fragment shading process processes the initially defined fragment data values for a fragment to derive the output data for the fragment (data needed to display the sample point(s) that the fragment represents) correctly. The fragment shader again may be a programmable unit that executes one or more fragment shader programs to shade (colour) the fragments appropriately.

The vertex and fragment shading operations normally operate, as is known in the art, on so-called "attributes". An attribute is an input or output variable in a shader program and may represent for example, a position, colour, or texture coordinate, etc.

The input attributes to the vertex shader may be referred to as primary attributes, and the output attributes of the vertex shader (which will also be the fragment shader input attributes) may be referred to as secondary attributes. There will normally be a fixed number of primary attributes (vertex shader input variables) and a fixed number of secondary attributes (vertex shader output/fragment shader input variables) for a given shader program (linked vertex and fragment shader).

For a particular draw call, for non-instanced drawing each primary attribute (vertex shader input variable) will have a defined value for each vertex of the draw call. In the case of instanced drawing, each primary attribute (vertex shader input variable) will have a defined value either for each vertex, or for each instance. Thus, in instanced mode operation, some primary attributes will have values that are defined on a per-vertex basis, and so may be thought of as "per-vertex" attributes. Equally, there may be primary attributes whose values are defined on a per-instance basis, which may accordingly be thought of as "per-instance" attributes.

As is known in the art, when a graphics processor is operating in so-called "instanced" mode, multiple "instances" of the same input geometry will be drawn (e.g. in a slightly different position each time). In this case, the vertex shader will be run once per vertex per instance (i.e. a number of times equal to the number of vertices times the number of instances), rather than just once per vertex. Thus there will normally be a vertex shader output (a secondary attribute value) generated for each secondary attribute (vertex shader output variable) for each different vertex and instance combination.

The primary attribute values are typically stored in memory for use by the vertex shader. (This is normally specified in the graphics API.) The application on the host system that requires the graphics processing will normally specify the memory layout of the vertex shader input attributes and the input attribute values.

To provide the output, vertex shaded, secondary attribute values to the subsequent processing stages, such as the fragment shader, in the case of traditional, immediate mode graphics processing units, the vertex shader outputs are typically channelled through internal pipelines inside the chip. In the case of deferred rendering graphics processors (such as tile-based graphics processors), the vertex shader outputs (vertex-shaded attribute values) are usually written to memory, from where they are then accessed as needed by the fragment shader, etc.

Where the attribute values are stored in memory, the vertex shader and fragment shader, etc., will normally be provided with and use appropriate memory addresses to store and retrieve the appropriate attribute values from the memory where those values are to be or are stored.

For example, a vertex shader will execute an instruction to load a particular input attribute value for processing, and that instruction will include or indicate a memory address to allow the vertex shader to retrieve the appropriate attribute value from memory where the input attribute values are stored. Similarly, a fragment shader will execute an instruction to load a particular vertex-shaded output attribute value for processing, and that instruction will include or indicate memory address(es) to allow the fragment shader to retrieve the appropriate output attribute values for each corner vertex of the polygon (primitive) in question from memory where the output attribute values (the outputs of the vertex shader) are stored.

The Applicants believe that there remains scope for improvements to the operation of graphics processors that include vertex shading stages, and in particular when those vertex shading stages are operating in instanced mode.

BRIEF DESCRIPTION OF THE DRAWINGS

A number of embodiments of the present technology will now be described by way of example only and with reference to the accompanying drawings, in which:

FIGS. 2A to 7 show schematically the operation of an embodiment of the technology described herein.

FIG. 2A shows a situation where there is no "pass-through" case identified for operation of the embodiment for non-instanced operation.

FIGS. 3 to 7 illustrate the operation of the present embodiment when operating in instanced mode.

FIG. 3 illustrates instanced mode operation where there is no "pass-through" or "per-vertex" or "per-instance" input only case identified.

FIG. 4 shows the situation where there is a "pass through" from a per instance input attribute.

FIG. 5 shows the corresponding case where there is a "pass through" from a per vertex attribute.

FIG. 6 shows the situation where there is a vertex shader output (secondary) attribute which depends only on per instance defined vertex shader input attributes.

FIG. 7 shows the corresponding situation where there is a vertex shader output (secondary) attribute which depends only on per vertex defined vertex shader input attributes.

DETAILED DESCRIPTION

Figure 1:
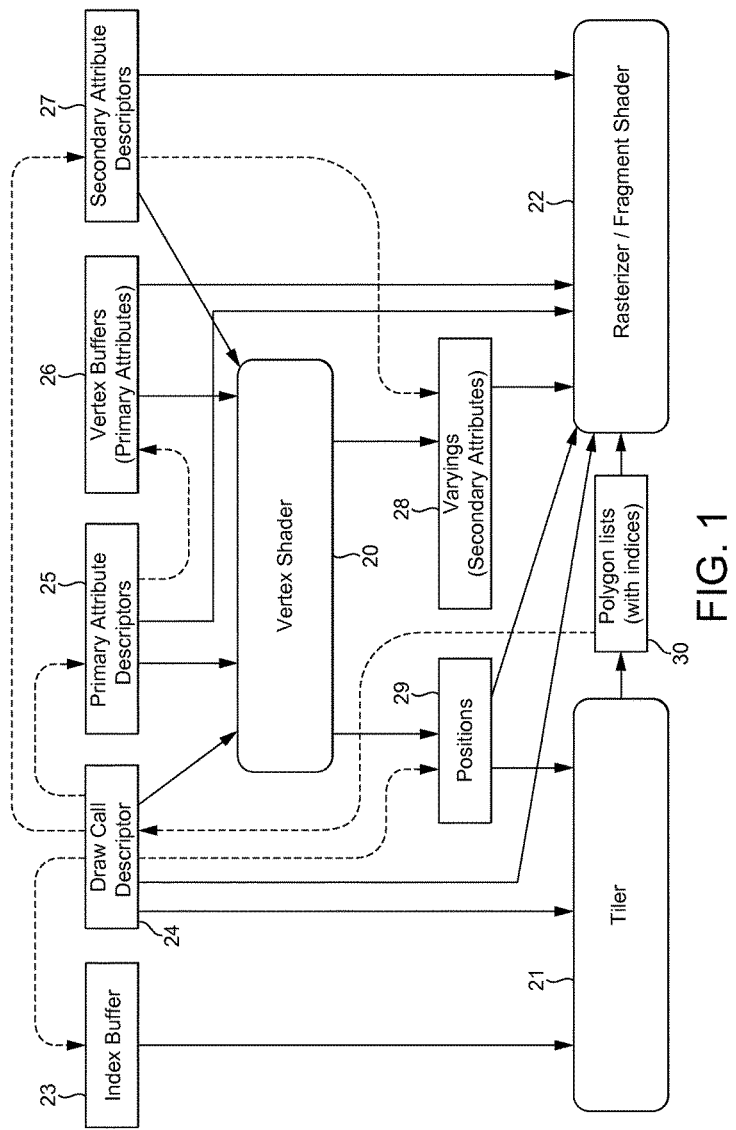
FIG. 1 shows schematically an embodiment of a graphics processing system that is in accordance with the technology described herein.

A first embodiment of the technology described herein comprises a method of operating a graphics processing system which includes a vertex shading stage which processes input attribute values to generate output vertex-shaded attribute values for use by subsequent stages of the graphics processing system, the method comprising:

when the vertex shading stage is operating in instanced mode, for a given draw call:
identifying vertex shader output attributes to be generated by the vertex shading stage for which the vertex shader input attributes that the vertex shader output attribute depends on are defined solely on a per-vertex basis or solely on a per-instance basis; and
when it is recognised that the vertex shader input attributes that a vertex shader output attribute to be generated depends on are defined solely on a per-vertex basis or solely on a per-instance basis:
the vertex shading stage:
in the case that the vertex shader output attribute depended solely on per-vertex defined input attributes storing only one copy of the vertex shader output attribute value to be generated by the vertex shading stage for use by subsequent stages of the graphics processing system for a given vertex, irrespective of the number of instances that the output attribute value applies to; and
in the case that the vertex shader output attribute depended solely on per-instance defined input attributes storing only one copy of the vertex shader output attribute value to be generated by the vertex shading stage for use by subsequent stages of the graphics processing system for a given instance, irrespective of the number of vertices that the output attribute value applies to; and
a subsequent graphics processing stages or stages:
in the case that the output attribute depended solely on per-vertex defined input attributes, using the single stored vertex shader output attribute value for a given vertex for each instance that the output attribute value applies to; and
in the case that the output attribute depended solely on per-instance defined input attributes, using the single stored vertex shader output attribute value for a given instance for each vertex that the output attribute value applies to.

A second embodiment of the technology described herein comprises a system for processing graphics comprising:

a plurality of graphics processing stages, including a vertex shading stage and at least one processing stage that is subsequent to the vertex shading stage, wherein the vertex shading stage processes input attribute values to generate output attribute values for use by the at least one subsequent processing stage of the graphics processor; and a processor configured to, for a given draw call, when the vertex shading stage is operating in instanced mode:
identify vertex shader output attributes to be generated by the vertex shading stage for which the vertex shader input attributes that the vertex shader output attribute depends on are defined solely on a per-vertex basis or solely on a per-instance basis; and to:
cause the vertex shading stage, when it is recognised that the vertex shader input attributes that a vertex shader output attribute to be generated depends on are defined solely on a per-vertex basis or solely on a per-instance basis:
in the case that the vertex shader output attribute depended solely on per-vertex defined input attributes storing only one copy of the vertex shader output attribute value to be generated by the vertex shading stage for use by subsequent stages of the graphics processing system for a given vertex, irrespective of the number of instances that the output attribute value applies to; and
in the case that the vertex shader output attribute depended solely on per-instance defined input attributes storing only one copy of the vertex shader output attribute value to be generated by the vertex shading stage for use by subsequent stages of the graphics processing system for a given instance, irrespective of the number of vertices that the output attribute value applies to; and to:
cause the at least one subsequent graphics processing stage that will process outputs of the vertex shading stage, in the event that it has been recognised that a vertex shader output attribute to be generated depends solely on per-vertex defined input attributes or solely on per-instance defined input attributes, to:

in the case that the output attribute depended solely on per-vertex defined input attributes, use the single stored vertex shader output attribute for a given vertex for each instance that the output attribute value applies to; and in the case that the output attribute depended solely on per-instance defined input attributes, use the single stored vertex shader output attribute value for a given instance for each vertex that the output attribute value applies to.

In the technology described herein, the graphics processing operation when operating in instanced mode is configured to recognise output attributes of the vertex shader for which the vertex shader input attributes on which the output attribute depends are defined solely per vertex (i.e. whose values are set per-vertex, but are the same across all instances of that vertex), or are defined solely per instance (i.e. whose values are set per-instance, but are the same across all vertices for that instance).

The Applicants have recognised that when operating in instanced mode, if the vertex shader input attributes for an output attribute of the vertex shader depend solely on per vertex defined input attribute(s) (i.e. on vertex shader input attributes whose values are defined on a per-vertex-basis), then the vertex shader will generate the same output attribute value for each combination of a given vertex with a different instance (i.e. the output attribute value that the vertex shader generates will be the same across all instances of any given vertex). This can be the case, for example, where the vertex shader input attribute is a texture co-ordinate for a vertex.

Similarly, if the vertex shader input attributes for an output attribute of the vertex shader depend solely on per instance defined input attribute(s) (i.e. on input attributes whose values are defined on a per-instance-basis), then the vertex shader will generate the same output attribute value for each combination of a given instance with a different vertex (i.e. the output attribute value that the vertex shader generates will be the same for each vertex for the instance in question).

The Applicants have further recognised that in such circumstances it may not be necessary to store a vertex shaded output attribute value for each per instance per vertex combination that the subsequent graphics processing stages will operate on, as the output attribute value for one per instance per vertex combination can be reused for the other per vertex per instance combinations that would have the same output attribute value.

The technology described herein exploits this by determining when such an only per vertex or per instance defined vertex shader input attribute dependent output attribute exists, and then causing the vertex shader to store only one copy of the (each) relevant output attribute value, which is then reused each time a subsequent graphics processing stage needs that value.

This has the advantage of avoiding storing plural identical output attribute values for use by the subsequent graphics processing stages, thereby saving, for example, on memory usage, and accordingly power usage, for the instanced mode vertex shader operations, for example compared to arrangements which store each identical output attribute value separately. This is generally beneficial, but may be particularly advantageous for graphics processing systems that are to be used in low power and portable devices.

Looked at another way, the technology described herein in effect identifies cases where the outputs of the vertex shader when operating in instanced mode will be identical, and then acts to store (and reuse as required) only one copy of each such identical vertex shader output attribute value.

Thus, for each different vertex shader output attribute that depends on vertex shader input attributes defined solely on a per-vertex basis, the technology described herein will store only one copy of the vertex shader output attribute value that is to be generated for that attribute for each respective vertex, irrespective of how many different instances of the vertex that output attribute value should be generated for.

Similarly for each different vertex shader output attribute that depends on vertex shader input attributes defined solely on a per-instance basis, the technology described herein will store only one copy of the vertex shader output attribute value that is to be generated for that attribute for each respective instance, irrespective of how many different vertices of the instance that output attribute value should be generated for.

The input attribute values (i.e. input variable values, as discussed above) that the vertex shader processes (and the corresponding output attribute values (output variable values) may be any suitable such attribute values that a vertex shader may operate on (and generate). They will typically be, as is known in the art, and in an embodiment are, values of attributes such as position, colour, etc.

It should be noted here that the technology described herein is equally applicable where the graphics processing system comprises plural vertex shaders, such as might the case for a multi-core system. In this case the vertex shading stage will contain plural individual vertex shaders, e.g., operating in parallel. In such an arrangement, each vertex shader may operate in the manner of the technology described herein, namely to store only one copy of each different only per-vertex vertex shader input attribute and only per-instance vertex shader input attribute dependent vertex shader output attribute value.

The subsequent graphics processing stages that are to use the outputs of the vertex shader can be any suitable and desired such graphics processing stages. They may be subsequent shader stages of the graphics processing system. In an embodiment, the subsequent graphics processing stage is a fragment shader. It could also, e.g., be a geometry shader.

The situation where the vertex shader input attributes that a vertex shader output attribute depends on are defined only on a per-vertex basis (i.e. the output attribute depends on a vertex shader input attribute or attributes whose value(s) is or are defined in respect of vertices only (and so will be the same across all instances of a given vertex)), or are defined only on a per-instance basis (i.e. the output attribute depends on a vertex shader input attribute or attributes whose value(s) is or are defined in respect of instances only (and so will be the same across all vertices for a given instance)), can be recognised in any suitable and desired manner, and at and in any suitable stage and processor of the system.

It may be done by identifying which vertex shader input attribute(s) each vertex shader output attribute is dependent upon, and then determining whether those input attributes are per-instance only or per-vertex only dependent attributes. Such a two-step process is advantageous, because although the vertex shader input attribute(s) that each vertex shader output attribute depends on may be set at a relatively earlier stage of the process, it may only be at a later stage in the graphics processing (e.g. at draw call time) that the per-vertex or per-instance nature of the input attributes is set.

In an embodiment, the vertex shader compiler does at least part of this process. Thus, in an embodiment, the vertex shader compiler is configured to, when it compiles the vertex shader code, identify for each vertex shader output attribute which vertex shader input attribute or attributes the output attribute depends on, and to record in meta-information, e.g. associated with the compiled vertex shader code, which vertex shader input attribute(s) each output attribute of the vertex shader depends on. This can be done using any desired compiler technique that is suitable to do this. This will then identify which vertex shader input attribute(s) each vertex shader output attribute depends on.

It should be noted in this regard that while every case of the vertex shader input attributes for a vertex shader output attribute being defined only on a per-vertex basis or only on a per-instance basis may be recognised and treated appropriately in the technology described herein, the Applicants have recognised that it may not always be possible for the mechanism that identifies which vertex shader input attributes a vertex shader output attribute is dependent on to be completely accurate or reliable in its operation. For example, where the vertex shader compiler is being used to do this, it may be (and indeed typically will be) the case that the compiler will not be able to identify perfectly this property for all shader programs.

To account for this, in an embodiment the mechanism for identifying the input attributes that a vertex shader output attribute is dependent upon is configured and constructed so as to give a conservative result, i.e. to "err on the safe side". Thus, in an embodiment, the arrangement is such that any error in identifying the input attributes that a vertex shader output attribute depends on should be such that the system will conclude (determine) that a vertex shader output attribute depends on some input attribute that it does not in fact depend on (i.e. to give a determined set of input attribute dependencies that is a superset of the actual dependencies), rather than missing a dependency of the output attribute that the output attribute does actually depend on.

Thus, the system may be configured such that any errors in the determination of the vertex shader input attributes that a vertex shader output attribute depends on are errors of determining that a vertex shader output attribute depends on some input attribute when in fact that is not the case. This will have the effect of the system behaving correctly for all situations (but potentially missing some opportunities for the optimisation and operation in the manner of the technology described herein).

It should also be noted here that, accordingly, references to operation of the technology described herein in a particular manner where a vertex shader output attribute has been identified as depending solely on per-vertex or solely on per-instance defined vertex shader input attributes, refer to those situations where the system, e.g., compiler, has identified such a situation (such a vertex shader output attribute). Similarly references to the dependencies of a given vertex shader output attribute on given vertex shader input attributes refer to those dependencies as identified by the system of the technology described herein (e.g. the compiler), unless the context requires otherwise.

The subsequent identification of whether the vertex shader input attributes for a given output attribute are per-vertex or per-instance only dependent attributes may then be done by the graphics processor driver, e.g. at draw call time, e.g. using the meta-information from the vertex shader compiler and the information in the parameters for the draw call that defines the per-vertex or per-instance nature of the input attributes.

Thus, the driver may identify for a, or for each, vertex shader output attribute whether the vertex shader input attributes that it depends on are defined solely on per-vertex basis or solely on per-instance basis or not. All the vertex shader output attributes may be classified according to which kinds of vertex shader input attributes they depend on (i.e. whether they depend only on per-vertex defined vertex shader inputs, only on per-instance defined vertex shader inputs, or on both, or on no vertex shader input attributes (i.e. the output attribute has a constant value for each draw call)).

Thus, in an embodiment, it is a combination of the vertex shader compiler and the driver for the graphics processor that identifies where and whether a vertex shader output attribute depends solely on per-instance or solely on per-vertex defined vertex shader input attributes.

It should be noted here that, as is known in the art, a given vertex shader output attribute, as well as depending on one or more vertex shader input attributes, can also depend on one or more per draw call inputs, which inputs will be a constant for a given draw call. The technology described herein can equally be used in those cases where a vertex shader output attribute depends on a per-draw call input(s) (a constant value defined for the draw call) in addition to per-vertex or per-instance defined vertex shader input attributes. Thus, references herein to a vertex shader output attribute depending solely on per-vertex or per-instance defined input attributes are intended to refer to the situation where all the vertex shader input attributes that a vertex shader output attribute depends on are defined solely on a per-vertex or per-instance basis, respectively, not to require that the output attribute depends only on per-vertex or per-instance defined vertex shader input attributes and nothing else (i.e. do not preclude the vertex shader output attribute also depending on other inputs, such as a per draw call defined input, that are not vertex shader input attributes).

Once a per-vertex or per-instance only vertex shader input attribute dependent output attribute has been identified, the vertex shader (or vertex shaders, where the vertex shading stage comprises plural individual vertex shaders) can be controlled to store only one copy of the output, vertex-shaded attribute values where the output attribute depends only on per-vertex or per-instance defined vertex shader input attributes in any suitable and desired manner, and at and by any suitable stage and processor of the system.

In an embodiment, the (or each) vertex shader is configured to write the (duplicate) output attribute value to the same place in memory (e.g. in an array of output attribute values) each time it generates it. In this way, there will only be one copy of the relevant output attribute value stored in memory (as any subsequently generated copies of that output attribute value will be written to the same place in memory, i.e. in effect, simply overwrite the previously stored version of the same output attribute value). Thus, e.g., the first time a given value of a per-vertex only defined vertex shader input attribute dependent output attribute is generated it may be written to, e.g., memory location X. Then, if that value of the per-vertex only defined vertex shader input attribute dependent output attribute is generated for another instance, it will again be written to the memory location X, and so on.

Thus, in an embodiment, the vertex shader (or shaders) is controlled to write each occurrence of a vertex shader output attribute value that depends solely on a given set of per-vertex defined vertex shader input attribute value(s) to the same place in memory, and to write each occurrence of a vertex shader output attribute value that depends solely on a given set of per-instance defined vertex shader input attribute value(s) to the same place in memory. In other words, each time a vertex shader output attribute value for which the vertex shader input attributes on which it depends are defined solely on a per-vertex basis or are defined solely on a per-instance basis falls to be generated, the corresponding generated output attribute value is stored in the same place in memory.

This may be conveniently achieved by using appropriate store attribute instructions to cause the vertex shader to store the attribute value at the same place in memory each time. Meta-information associated with the attributes that is read and/or used when a store attribute instruction is executed may be used to cause the vertex shader to store the attribute value at the same place in memory each time.

In an embodiment, the vertex shader (or vertex shaders) is configured (controlled) to write the (or each) relevant output attribute value, where a per-vertex or per-instance only dependent output attribute is identified, into memory (e.g. into an output attribute value array) only once (i.e. such that for other times the same output attribute value is to be generated, it is not then written to memory at all (rather than overwriting it to the same place in memory)). Thus, for example, when a given value of a per-vertex input attribute only dependent output attribute is generated for a particular instance, such as instance 0, it will be written to memory, but if that per-vertex input attribute only dependent output attribute value is generated for other instances of the same vertex, the value will not be written to memory at all.

Thus, in an embodiment, the vertex shader (or shaders) is controlled to write one occurrence of a vertex shader output attribute value that depends solely on a given set of per-vertex defined vertex shader input attribute value(s) or that depends solely on a given set of per-instance defined vertex shader input attribute value(s) to memory, but to not write any other occurrences of that vertex shader output attribute value to memory. In other words, one time (e.g. the first time) a vertex shader output attribute value that depends solely on a given set of per-vertex defined vertex shader input attribute value(s) or that depends solely on a given set of per-instance defined vertex shader input attribute value(s) falls to be generated, that output attribute value is written to memory, but if that output attribute value falls to be generated another time (e.g. again), it is not written to memory.

This has the advantage that not only is the memory usage for storing the duplicated vertex shader output attribute values avoided, but the writing of those values to memory and thus the corresponding write traffic is avoided as well. This can further reduce memory traffic and usage, and accordingly power usage, for vertex shader operations in the graphics processing system.

Such an arrangement may also be particularly advantageous in a multi-core graphics processing system where, as is known in the art, multiple vertex shaders may be trying to write to the output attribute array simultaneously. In that case, if plural vertex shaders try to write to the same location, there could be fighting over cache line ownership, potentially reducing performance. By only writing each duplicate output attribute value once to memory, this problem may be avoided.

An example mechanism for controlling the vertex shader(s) to write a respective attribute value to memory only once is discussed in more detail below.

The system should operate in the manner of the technology described herein at least when the vertex shading stage is operating in instanced mode, but it could operate in this manner all the time, if desired. Where the compiler and driver are used, as discussed above, to implement the technology, the compiler part of the operation may always happen (since the compiler will not know whether instanced mode will be used), but the driver part of the operation may only be triggered for instanced mode draw calls.

The system should operate in the manner of the technology described herein for each respective draw call that is to be processed. Thus, for example, references to storing a single copy of an output attribute value refer to storing a single copy for a given draw call. Thus, the system may operate in the manner claimed for a (or for each) respective draw call that it is to process. Equally where, for example, an initially defined single draw call may be split into plural different draw calls (e.g. to be handled either serially or in parallel, or in some combination of this) for processing, each of the separate (split) draw calls should be processed separately (in itself) in the manner of the technology described herein (i.e. have only a single copy of output attribute value(s) stored etc., if appropriate).

As will be appreciated by those skilled in the art, the single copies of the per-vertex only or per-instance only dependent output attribute values will need to be stored and organised in memory in an appropriate fashion for use by the subsequent graphics processing stages, such as the fragment shader. They can be arranged in memory in any suitable and desired fashion to achieve this.

In an embodiment, the per-vertex and per-instance only output attribute values are arranged and indexed in memory on the basis of and using the relevant vertex index or instance index, respectively, for the vertex shader input attribute value(s) that they are dependent on. In other words, the output attribute values for a given solely per-vertex defined vertex shader input attribute dependent output attribute will be indexed using the vertex indices of the respective vertices for which the corresponding vertex shader input (vertex-dependent) attribute value(s) on which the output attribute value depends are defined. Similarly the output attribute values for a given solely per-instance defined vertex shader input attribute dependent output attribute will be indexed using the instance indices of the respective instances for which the corresponding vertex shader input (instance-dependent) attribute value(s) on which the output attribute value depends are defined. Per-instance attributes may also divide the instance index by a defined instance divisor.

This is a particularly convenient mechanism for indexing the output attribute values where they have been stored on a once per-vertex or once per-instance basis. Thus, in an embodiment, the vertex shader stores the per-vertex or per-instance input attribute only dependent output attribute values in memory locations that are indexed by the vertex index or instance index, respectively, of the corresponding input attribute value(s) on which the output attribute value depends.

The vertex shader may be configured to store the output attribute values at the appropriate memory location (e.g. indexed by the vertex or instance index, as appropriate) in any desired and suitable manner. The vertex shader may store attribute instructions when executed cause the vertex shader to store the attribute values at the desired memory locations.

The vertex shader input attribute values may also be indexed on the basis of which vertex or instance (where instanced mode is used) they relate to. Thus, vertex-shader input attribute values that are defined on a per-vertex basis may be indexed in memory with reference to the vertex to which they relate (i.e. using an (input) vertex index). Similarly vertex-shader input attribute values that are defined on a per-instance basis may be indexed with reference to the instance to which they relate (i.e. using an (input) instance index). Per-instance attributes may also divide the instance index by a defined instance divisor.

Furthermore, although, as discussed above, the particular per-vertex only or per-instance only input dependent output attributes of the vertex shader may be indexed in memory on a per-vertex or a per-instance basis, the output attribute values of the vertex shader may also be indexed using an "unfolded" output index. This is because although there will normally only be one vertex shader input attribute value for each vertex for each vertex dependent input attribute, and one vertex shader value input for each instance for each instance dependent input attribute, the output of the vertex shader will in the normal course be "unfolded" or "blown-up" to provide a separate output attribute value for each output attribute for each vertex for each instance (for each separate vertex and instance combination).

The subsequent graphics processing stage(s), such as the fragment shader, can be configured to use the single stored vertex shaded output attribute value each time it is required in any suitable and desired manner.

This may be done by using load attribute instructions for the graphics processing stage, such as the fragment shader, that when executed cause the graphics processing stage to load the desired attribute values. This could comprise, for example, providing the memory address or addresses where the relevant output attribute value is stored in the load instruction itself, but in an embodiment, an indexing mechanism (the above indexing mechanism) is used when retrieving (loading) the attribute values.

Thus, in an embodiment, the subsequent graphics processing stage(s), such as the fragment shader, reuse the single stored vertex shaded output attribute value each time they are to process a copy of that vertex shaded output attribute value by using the same index into the vertex shaded output attribute values each time they are to process a copy of the output attribute value in question (i.e. so that they will read the same entry from the stored vertex shaded output attribute values each time).

Thus, in an embodiment, the subsequent graphics processing stages, such as the fragment shader, are provided with appropriate indices to allow them to retrieve and use the same stored only per-instance or per-vertex defined vertex shader input attribute dependent output attribute value, each time that output attribute value is to be used.

The subsequent graphics processing stages can be caused to use the same index into the stored output attribute values in any appropriate manner, for example by being provided each time with the same, appropriate index to use directly. Thus, for example, the e.g. fragment shader compiler could generate a load input instruction for the fragment shader that includes or indicates the appropriate index. In the case where, as discussed above, per-vertex only or per-instance only defined vertex shader input attribute dependent output attribute values are indexed using the relevant input vertex or instance index, then the subsequent graphics processing stages, such as the fragment shader, would, in these arrangements, accordingly be provided with the relevant vertex index or instance index to be used to retrieve the output attribute value directly (and in one embodiment this is done).

However, as discussed above, it is possible to be able also to use an "unfolded" output index for the outputs of the vertex shader (for the vertex shader output attribute values) (and hence for the inputs to the fragment shader, etc.), because although the vertex shader input attribute value array will normally only contain one entry (attribute value) for each vertex for each vertex dependent input attribute and one entry (attribute value) for each instance for each instance dependent input attribute, the output of the vertex shader would in the normal course be "unfolded" or "blown-up" to provide a separate output attribute value for each output attribute for each vertex for each instance (for each separate vertex and instance combination).

Where this is the case, it would be possible to configure the graphics processing system to be able to provide to the subsequent graphics processing stages, such as the fragment shader, and for those subsequent graphics processing stages to use directly, either the "unfolded" output index for the output attribute values or a vertex index or an instance index, as required.

However, in an embodiment, the graphics processing system is configured to provide a single form of output index, which may be in the form of an "unfolded" output index as discussed above, to the subsequent graphics processing stages, with any other form of index (such as a vertex index or instance index, as discussed above) to be used for the per-vertex only and per-instance only defined vertex shader input attribute dependent output attribute values then being derivable from, and derived from, that output index, when required.

Thus, in an embodiment, the subsequent graphics processing stages, such as the fragment shader, when they are to process an output, vertex shaded, attribute value, are provided with an "unfolded" output attribute value index from which the appropriate index to use for per-vertex only or per-instance only defined vertex shader input attribute only dependent output attribute values (e.g. the vertex index or the instance index in the above embodiment) can be derived, if required. This then means that only a single form of index (namely the output, "unfolded", index) needs to be provided to the subsequent graphics processing stages (rather than requiring those stages to support and potentially be provided with multiple forms of index). Moreover, using an output, unfolded index as the form of index that is used is advantageous, because in general indices in that form will occupy less storage space than providing, e.g., both a vertex index and an instance index.

The "unfolded" output index may be provided and/or indicated by the load (or store) attribute instructions that the graphics processing stage is to execute.

In these arrangements, the index(es) to use for the single stored copies of the output attribute values can be derived from the output index that is provided to the subsequent graphics processing stages in any suitable and desired manner. They may be derivable (and derived) in a predetermined manner from the output index.

In an embodiment, the indices which can be derived from the output "unfolded" index that is provided to the subsequent graphics processing stages comprise a vertex index or an instance index, as discussed above.

In an embodiment, one of the vertex index and the instance index can be derived from the output index by means of a modulus operation on the output index value, and the other of the vertex index and instance index can be derived from the output index by performing a division operation on the output index value.

The output "unfolded" index that is used for the vertex shader output attribute values (and that is, inter alia, provided to the subsequent graphics processing stages) may be derived in a predetermined manner from the instance index and/or vertex index of the input attribute value(s) that the vertex shader processes (or would process) to generate the relevant output, vertex shaded, output attribute value. This then means that by reversing the output index generation operation, the corresponding vertex index or instance index can be retrieved. (In other words, the Applicants have recognised that if the output, unfolded index is derived in a suitable manner from the defined vertex and instance input attribute value indices, then that output index can be broken up to provide the corresponding vertex or instance indices, thereby providing a mechanism for retrieving the vertex or instance attribute value indices without needing to specify them directly.)

Thus, in an embodiment, the indexes to be used for the vertex shader output attribute values (and to be provided to the subsequent graphics processing stages when they are to process the output attribute values generated by the vertex shader) are generated in a predetermined manner from the vertex index and the instance index of the vertex and instance that corresponding vertex shader input attribute values are defined for.

The output index value to be used (the index that is provided to the fragment shader, etc.) may be derived as follows:

output index value=(vertex index)+(instance index)×(padded instance size)

where the "padded instance size" is a set (selected) value which is equal to or greater than the number of vertices per instance.

This then means that the (input) vertex index can be obtained from the output index value by the modulus operation:

vertex index=(output index value)modulo(padded instance size)

and the (input) instance index can be obtained from the output index value by the division operation:

instance index=floor((output index value)/(padded instance size))

The effect of this is that each output index that is generated for each instance of a given input vertex, for example, will, when subjected to the above modulus operation return the same vertex index, and each output index that is generated for each vertex of a given input instance will, when subjected to the above division operation return the same instance index. Thus, the fragment shader, for example, can derive the same index (the vertex index or instance index) for retrieving the single copy of the per-vertex or per-instance only defined vertex shader input attribute dependent output attribute value (as appropriate) each time it needs that output attribute value (even though each occurrence of that output attribute value will have a different "output index" value).

The "padded instance size" should be at least equal to the number of vertices per instance (which will be defined, e.g., for the draw call in question), but it need not be exactly this number. It may be set to a value that is efficient to use when performing modulus operations in hardware (as that will then allow a simpler modulus circuit than fully general modulus would require). It may be rounded up to the next bigger or equal value (above the number of vertices per instance) that it is (relatively) easy to do a modulo of Where the graphics processing system uses an API mechanism for instancing that allows per-instance input values to have a further divisor value on the instance index for specific attributes, then such a further divisor mechanism may correspondingly be used when indexing into any per-instance input attribute values to which this applies (with the further divisor simply being multiplied onto the divisor value (the padded instance size) when deriving the instance index to be used to retrieve those attribute values from the output, unfolded, index that is provided to the, e.g., fragment shader).

Thus, when the fragment shader (or other subsequent graphics processing stage) is to process a vertex shader output attribute value for which the vertex shader input attributes on which the vertex shader output attribute depends are defined solely on a per-vertex or per-instance basis, the e.g. fragment shader will be directed to load a vertex shader output attribute value and be provided with an output index value from which it will then derive an index to be used to retrieve the desired vertex shader output attribute value.

In the arrangement discussed above where different operations may be used to derive the desired index from the provided output index, the graphics processing stage will also need to be told which index derivation operation to use (and any values to be used in that operation).

While it would be possible in this regard for the load instruction to the graphics processing stage such as the fragment shader to include all the information needed to derive the index to be used to retrieve the relevant vertex shader output attribute value, in an embodiment, the index derivation operation to be performed, and, possibly, any data (values) needed for that operation, may be indicated by, and/or provided as, meta-information that is separate to the load instruction itself. This meta-information may indicate whether the output index provided to the fragment shader, etc., should be subjected to a modulo or division operation, as discussed above, to derive a vertex index or instance index for use when retrieving the attribute value(s). This meta-information may also indicate or include the appropriate modulo or divisor value (i.e. the padded instance size, and the instance divisor if necessary) to be used to derive the desired index.

In an embodiment, the meta-information is associated with the attribute in question. Then, whenever a value for an attribute is to be processed, the meta-information associated with the attribute may be read to determine the index derivation method, if any, to be used to determine the index to be used to retrieve the attribute value itself.

Thus, in an embodiment, each identified only per-vertex or per-instance defined vertex shader input attribute dependent output attribute, has associated with it meta-information that causes a subsequent graphics processing stage to use the appropriate single stored vertex shaded output attribute value when that vertex shader output attribute is required. This meta-information may then be used by the subsequent graphics processing stage(s) to retrieve the correct vertex shader output attribute value (the single stored copy of the vertex shaded output attribute value) for use.

In an embodiment, this meta-information is in the form of an attribute descriptor, which may indicate, inter alia, whether the corresponding attribute is a "divisor" attribute (i.e. should use a division operation on "the unfolded" output index to derive the index to use), or a "modulo" attribute (i.e. should use a division operation on "the unfolded" output index to derive the index to use), or a "normal" or "linear" attribute (i.e. should use the "unfolded" output index directly), and the corresponding divisor or modulo value (the padded instance size (and the instance divisor, if necessary)), as appropriate.

In the arrangement discussed above, vertex shader output attributes that are dependent solely on per-vertex defined vertex shader input attributes will be defined as modulus attributes with a modulus value equal to the padded instance size, and vertex shader output attributes that are dependent solely on per-instance defined vertex shader input attributes will be defined as divisor attributes with a divisor value equal to the padded instance size (multiplied by any required instance divisor, if required).

Thus, in an embodiment, meta-information, which may be in the form of an attribute descriptor, that indicates how to derive the correct index to allow the desired output attribute value to be retrieved is generated and stored for a, or for each, vertex shader output attribute. The subsequent graphics processing stages (e.g. fragment shader) may then use that meta-information to derive the desired index into the stored vertex shader output attribute values.

In an embodiment this mechanism is also used by the vertex shader to store its output attribute values. This provides a particularly convenient mechanism for causing the vertex shader to store only one copy of each solely per-vertex or per-instance vertex shader input attribute dependent output attribute value, as it will cause the vertex shader to derive the same vertex or instance index at which to store the output attribute value, for each vertex and instance combination that the output attribute value falls to be generated for.

Thus the store attribute instructions to the vertex shader may include or indicate an unfolded output index to be used in relation to the values in question of the attribute, and the vertex shader then determines from meta-information how to process that index to derive the actual index (the vertex or instance index) to be used to store the value of the output attribute to be processed.

In an embodiment, each vertex shader output attribute has a corresponding output attribute descriptor. Each vertex shader input attribute may also have a corresponding input attribute descriptor.

The vertex shader output attribute descriptors may be used, as discussed above, by the vertex shader to determine where to write its output attribute values, and by the subsequent graphics processing stages, such as the fragment shader, to determine where to read them. The input attribute descriptors may be used by the vertex shader, inter alia, to access its input attribute values correctly.

Thus, in an embodiment, there is an array of meta-information comprising a plurality of attribute descriptors each associated with and corresponding to a respective output attribute of the vertex shader, which attribute descriptors inter alia, contain information to allow a graphics processing stage, such as the vertex shader or fragment shader, to store the attribute value in, or retrieve the attribute value from, the appropriate place in memory.

There may similarly be an array of meta-information comprising a plurality of attribute descriptors each associated with and corresponding to respective input attributes of the vertex shader.

The attribute descriptors may be generated by the graphics processor driver at draw call time. The driver may generate and store the attribute descriptors appropriately once it has determined the per-vertex or per-instance (or both or neither) dependencies of the vertex shader output attributes (and input attributes).

Thus, in an embodiment, the graphics processor driver is configured to generate meta-information (which may be associated with the vertex shader output attributes) to cause the vertex shader to write the per-vertex only or per-instance only vertex shader input attribute dependent output attribute values to the same place in memory each time they are to be generated.

The relevant meta-information, e.g. attribute descriptors, to be read (used) by a graphics processing stage when it is to process an attribute value can be indicated in any desired and suitable manner. In an embodiment, each attribute is assigned an attribute index, and these attribute indices are then used to indicate the meta-information (attribute descriptors) to use. The attribute indices may conveniently be assigned by the vertex shader compiler, for example.

Thus, in an embodiment, the meta-information (attribute descriptors) is identified and read by using an attribute index assigned to the attribute in question. The attribute descriptors may be stored in an attribute descriptor array (or arrays), and indexed therein by using the attribute index assigned to the attribute in question. (It should be noted here that as the attribute descriptors relate to particular attributes (not to particular attribute values), then for a particular shader program, there will be a fixed number of attribute descriptors, irrespective of the number of vertices and instances drawn in any particular draw call.)

The attribute index for the meta-information (attribute descriptor) to be used may be provided to the graphics processing stage in the corresponding store or load instruction.

Thus, there may be a meta-information array that is indexed into using defined attribute indices. Then, the graphics processing stage, such as the vertex shader or fragment shader, can use the attribute index it receives (e.g. in a load or store instruction) to look-up the meta-information and then, if the meta-information so indicates, derive the actual index to be used to store or retrieve the attribute value to be processed in the appropriate manner from the provided output index.

In an embodiment, the particular index, such as the instance index, vertex index, or "unfolded" index, that is used to retrieve the attribute values, as discussed above, is used in relation to a base memory (buffer) address that defines a starting (base) address for the relevant indexed attribute values. This then means that, for example, all the attribute values that are indexed by reference to the instance to which they relate can be so-indexed in relation to a single, common, base buffer address in memory. This simplifies the loading and storing of the attribute values and their organisation in memory when they may be indexed, for example, in relation to the vertex, instance or vertex/instance combination, to which they relate.

In an embodiment, in addition to the appropriate index and buffer base address, further information is used when retrieving and to retrieve the attribute values. In an embodiment this further information includes further parameters or information relating to the layout of the attribute values in memory (in the buffer). This further information about the layout of the attribute values in memory may comprise one or more or all, of an indication of the spacing of the attribute values in memory (in the form of a "stride" value), an indication of the relative position of the attribute in question to a or the base memory address (in the form of an "offset" value), and/or a "type" indicator for the attribute value, indicating the component data type and number of components for the attribute. (In an embodiment, the attribute load and store instructions perform a data format conversion based on the data type specified.)

In these arrangements, the graphics processing stage may accordingly be provided with the appropriate buffer base address (and other information, where needed) for storing or retrieving the attribute values, as well as an indication of the technique to use for, and any data necessary for, deriving the index to be used to retrieve (or store) the desired attribute value. Thus, in an embodiment, the graphics processing stage is provided with an index and a base memory address, possibly together with other data such as a stride, offset, and/or data type, from which it then derives the memory address to use to store or retrieve the attribute value.

The buffer base address, etc., information could be provided or indicated by the load (or store) instruction directly. However, in an embodiment the buffer base address is provided as meta-information, which may be in the form of an attribute descriptor, that is associated with the attribute in question, e.g. in the manner discussed above. The other information, such as the stride, offset, and data type (where used) may be provided in this form as well.

Thus, in an embodiment, each attribute descriptor (as discussed above), also or instead may indicate, a buffer base address (a memory base address), possibly together with other information, such as the stride, offset, and data type, to be used when retrieving or storing values of that attribute. Thus, in an embodiment, an, or each, attribute descriptor indicates, inter alia, a buffer base address and an index derivation mechanism (and possibly other information, such as the stride, offset, and data type) to be used when values of its associated attribute are to be loaded or stored.

Thus, in an embodiment, meta-information, which may be in the form of an attribute descriptor, that indicates how to derive the appropriate index to allow the desired output attribute value to be retrieved or stored and a base memory address that the index is in relation to, possibly together with other information, such as the stride, offset, and data type, is generated and stored for a, some or each, vertex shader output attribute. The graphics processing stages (e.g. vertex shader or fragment shader) may then use that meta-information to derive the memory addresses at which to store or at which are stored the vertex shader output attribute values.

The vertex shader input attributes may be arranged in the same way, i.e. they have corresponding associated meta-information, which may be in the form of attribute descriptors, that provide the index derivation and base memory address information, etc., in the same manner as for the vertex shader output attributes discussed above.

As discussed above, the vertex shader (or shaders) may be controlled to write a given per-vertex or per-instance only defined vertex shader input attribute dependent output attribute value to memory only once. The vertex shader (or shaders) can be controlled to do this in any suitable and desired manner.

The arrangement may be such that a solely per-vertex defined vertex shader input attribute dependent output attribute value will only be written for one particular instance in the sequence of instances that that per-vertex dependent output value should be generated for (e.g. instance 0 where the instances are numbered 0, 1, 2, . . . ), and a solely per-instance defined vertex shader input attribute dependent output attribute value will only be written for one particular vertex in the sequence of vertices that that per-instance dependent output value should be generated for (e.g. vertex 0 where the vertices are numbered 0, 1, 2, . . . ).

In an embodiment the vertex shader (or shaders) may be controlled to write a given only per-vertex or only per-instance vertex shader input attribute dependent output attribute value to memory once by means of meta-information associated with the output attributes of the vertex shader, which meta-information may then trigger the vertex shader to determine whether to write the output attribute value to memory or not.

There may be a flag (a "write reduction" flag) that the data generating vertex shader can check to see if it should determine whether to write the output attribute value to memory (e.g. to the output attribute value array) or not.

The meta-information (e.g. "write-reduction" flag) may be generated by the graphics processor driver, e.g. at draw call time, as discussed above, as this is when the relevant per-vertex or per-instance only dependence of the output attributes may be determined.

In an embodiment, this "write" meta-information (e.g. the "write reduction" flag) is included in a relevant attribute descriptor (as discussed above) for the output attribute in question. Then, by reading the attribute descriptor, it can be determined whether to write the output attribute value to the output attribute value array or not.

The "write" meta-information (e.g. in the attribute descriptor) may indicate whether there is a need to test whether the output value is to be written or not. The write meta-information and/or other meta-information may then indicate the form that the test should take and any parameters needed for the test (with the result of the test then determining whether the output value should be written to memory (e.g. to the output attribute value array or not).

Thus, in an embodiment, the vertex shader is triggered to perform a test to determine whether the attribute value (or at least the current iteration of the attribute value) should be written to memory or not.

In an arrangement where the per-vertex only or per-instance only defined vertex shader input attribute dependent vertex shader output attributes are classified as modulus attributes or divisor attributes, as discussed above, then if the write meta-information, e.g. write reduction flag is set, the vertex shader may only store (writes to memory) an output value for a modulus attribute if the output index divided by the modulus value (the padded instance size), rounded down, is zero, and only stores (writes to memory) an output value for a divisor attribute if the output index modulo the divisor value is zero.

This will have the effect that per-vertex only defined vertex shader input attribute dependent output attribute values are only written for instance 0, and per-instance only defined vertex shader input attribute dependent output attribute values are only written for vertex 0. Thus only one copy of each duplicate output attribute value will be written to memory (e.g. to the output attribute values array).

The write-meta-information may be read when the vertex shader executes a store attribute instruction, with the vertex shader then either continuing with the store operation or aborting it, depending on the write meta-information and the result of any test triggered by that information.

The use of meta-information, e.g. attribute descriptors, to indicate an index derivation process to be used to derive an index for retrieving (or storing) a desired attribute value, and/or to indicate a base memory address, etc., to be used when retrieving (or storing) a desired attribute value, and/or to ensure that only a single copy of an attribute value is stored in the manner discussed above, is particularly advantageous because it, for example, means that this information is separate from and independent of the shader code. This then allows, e.g., the same shader code to be used with different sets of meta-information (attribute descriptors), and avoids the need to change the shader code when the parameters controlled by the meta-information (such as the organisation of the attribute values in memory) change. It also allows the same mechanism to be used to control both the input and output from the vertex shader, and to be used by the vertex shader and the subsequent graphics processing stages, such as the fragment shader.

It is accordingly believed that such use of meta-information associated with vertex shader attributes, for example, to indicate an index derivation process to be used to derive an index, and/or to indicate a base memory address to be used, for retrieving a desired attribute value in a graphics processing system may be new and advantageous in its own right, and not just where duplicated output attribute values have been identified.

A third embodiment of the technology described herein comprises a method of operating a graphics processing system that includes a vertex shading stage which processes values of input attributes to the vertex shading stage to generate values of output attributes of the vertex shading stage for use by subsequent stages of the graphics processing system, the method comprising:

associating with one or more attributes of the vertex shading stage, meta-information to be used when loading and/or storing values of the attribute in question; and a graphics processing stage when it is to load and/or store a value of a vertex shading stage attribute, first reading any meta-information associated with that attribute and then using the meta-information when it loads or stores the value of the attribute.

A fourth embodiment of the technology described herein comprises a graphics processing system comprising:

a plurality of graphics processing stages, including a vertex shading stage and at least one processing stage that is subsequent to the vertex shading stage and that will process outputs of the vertex shading stage; wherein:

the vertex shading stage processes values of input attributes to the vertex shading stage to generate values of output attributes of the vertex shading stage for use by subsequent stages of the graphics processing system; and the graphics processing system is configured to associate with one or more attributes of the vertex shading stage, meta-information to be used when loading and/or storing values of the attribute in question; and one or more of the graphics processing stages is configured to, when it is to load and/or store a value of a vertex shading stage attribute, first read any meta-information associated with that attribute and then use the meta-information when it loads or stores the value of the attribute.

As will be appreciated by those skilled in the art, these embodiments of the technology described herein can and may include any one or more or all of the optional features of the technology described herein, as appropriate.

Thus, for example, the meta-information may be in the form of an attribute descriptor as discussed above, with at least some and/or all of the vertex shader attributes having a corresponding attribute descriptor. Similarly the meta-information (attribute descriptors) may be generated by the graphics processor driver, and may be generated at draw call time. The meta-information may comprise information indicating how, and/or where from or to, to store and/or load the value of the attribute.

The meta-information may accordingly include or indicate information to allow the memory address where the attribute value is stored (or is to be stored) to be determined. Thus it may allow an index to be used when loading (or storing) a value of the attribute to be determined, e.g. by indicating a process to be used to derive an index to be used when loading (or storing) a value of the attribute. It also or instead may indicate a base memory address to be used when loading (or storing) a value of the attribute.

In an embodiment, the meta-information is also or instead used to control the number of times an attribute value is written to memory. It may indicate information that can be used to test whether the attribute value should be stored in memory or not, e.g. in the manner discussed above.

As discussed above, in an embodiment, the meta-information can indicate further information about the layout of the attribute values in memory. This could, for example, comprise an indication of the spacing of the attribute values in memory (the "stride"), the relative position of the attribute in question to a or the base memory address (the "offset"), etc.

As discussed above, a stage or stages of the graphics processing system may be configured to, when it is to process an attribute of the vertex shading stage, read the meta-information associated with the attribute, and, if the meta-information so indicates, then derive the index to be used for retrieving or storing the value of the attribute in accordance with the meta-information, e.g. relative to any base memory address indicated by the meta-information.

A stage of the graphics system may execute a load attribute instruction indicative of an attribute to be processed, and in response to that load attribute instruction then read the meta-information associated with the attribute in question and determine from that meta-information whether and how to derive an index to be used to retrieve or store the required attribute value, and/or a base memory address to be used when retrieving or storing the required attribute value.

The meta-information may be used at least when vertex shader attribute values are to be loaded. It may be used when both loading and storing vertex shader attribute values (and thus both vertex shader input and vertex shader output attributes may have meta-information associated with them).

Similarly, at least one subsequent graphics processing stage, e.g. the fragment shader, may use the meta-information. The vertex shader may use it as well.

The technology described herein also extends to the generation of the meta-data.

Thus, a fifth embodiment of the technology described herein comprises a method of operating a graphics processing system that includes a vertex shading stage which processes values of input attributes to the vertex shading stage to generate values of output attributes of the vertex shading stage for use by subsequent stages of the graphics processing system, the method comprising:

associating with one or more attributes of the vertex shading stage, meta-information to be used when loading and/or storing values of the attribute in question.

A sixth embodiment of the technology described herein comprises a graphics processing system comprising:

a plurality of graphics processing stages, including a vertex shading stage and at least one processing stage that is subsequent to the vertex shading stage and that will process outputs of the vertex shading stage; wherein:

the vertex shading stage processes values of input attributes to the vertex shading stage to generate values of output attributes of the vertex shading stage for use by subsequent stages of the graphics processing system; and the graphics processing system is configured to associate with one or more attributes of the vertex shading stage, meta-information to be used when loading and/or storing values of the attribute in question.

As will be appreciated by those skilled in the art, these embodiments of the technology can and may include any one or more or all of the optional features of the technology described herein, as appropriate. Thus the meta-information may take the form described above, and may be generated by the driver for the graphics processor of the graphics processing system, e.g. at draw call time.

As will be appreciated by those skilled in the art, the subsequent graphics processing stage, such as the fragment shader, may and will use the attribute values (vertex shader input and/or vertex shader output attribute values) for their normal processing, and in the normal manner (save for the changes introduced by the technology described herein). For example, in the case of a fragment shader, the fragment shader will use the attribute values to render a primitive or primitives to generate a set of render output values, e.g. representing a frame for display. These output values may then be exported to external memory for storage and use, such as to a frame buffer for a display.

Thus, the technology described herein may further comprise using the vertex shader output attribute values or the corresponding vertex shader input attribute values, as appropriate, to render one or more primitives to which the attribute values relate so as to generate a set of output values representing a desired output of the graphics processing system, such as a frame for display. The rendering process may include, for example, blending, fragment shading, texturing, etc., the attribute values, as is known in the art.

Similarly, the technology described herein may further comprise a subsequent graphics processing stage or stages using the vertex shader output attribute values or the corresponding vertex shader input attribute values, as appropriate, to generate a set of output data values for output from the graphics processing system.

In an embodiment, the subsequent graphics processing stage comprises a fragment shader. In this case, the technology described herein may further comprise a fragment shader of the graphics processing system using the vertex shader output attribute values or the corresponding vertex shader input attribute values, as appropriate, to generate a set of fragment-shaded output data values for, e.g. sampling positions of an output, such as a frame to be displayed, to be generated by the graphics processing system.

The output, e.g. fragment shaded, data values may then be exported to external, e.g. main, memory, for storage and use, such as to a frame buffer for a display. They may be temporarily stored locally to the graphics processor, e.g., in a tile buffer or buffers, before being exported to main memory, e.g., depending upon the nature and configuration of the graphics processing system, as is known in the art.

The technology described herein can be used for all forms of output that a graphics processing pipeline may be used to generate, such as frames for display, render-to-texture outputs, etc.

It will be appreciated that as an output to be generated (rendered) by the graphics processing pipeline will typically be made up of plural primitives (and tiles in a tile-based system), in practice the techniques described herein will be repeated for each primitive (and tile) making up the output, so that eventually an appropriate set of rendered fragment data has been generated for each sampling point of the output that is needed.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

The vertex shader, fragment shader, and any other graphics processing stages can accordingly be implemented as desired and in any suitable manner, and can perform any desired and suitable vertex shading, or fragment shading, etc., functions, respectively.

Similarly, the various input and output attribute values, meta-information, attribute descriptors, etc., can be defined and stored in any suitable and desired manner.

It should also be noted here that, as will be appreciated by those skilled in the art, the various functions, etc., of the technology described herein may be duplicated and/or carried out in parallel on a given processor. Thus, for example, as discussed above, the vertex shading stage may comprise plural separate vertex shaders, operating in parallel.

The technology described herein is applicable to any suitable form or configuration of graphics processor and renderer, such as processors having a "pipelined" rendering arrangement. It is particularly applicable to tile-based graphics processors and graphics processing systems.

The technology described herein accordingly extends to a graphics processor and a graphics processing platform including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology also extends to a computer software carrier comprising such software which when used to operate a graphics processor, renderer or microprocessor system comprising data processing means causes in conjunction with said data processing means said processor, renderer or system to carry out the steps of the methods of the technology described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods need be carried out by computer software and thus a further broad embodiment of the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a tile-based graphics processing system that may be operated in the manner of the technology described herein. The figure shows the main elements of the graphics processing system that are relevant to the operation of the present embodiment. As will be appreciated by those skilled in the art there may be other elements of the graphics processing system that are not illustrated in FIG. 1.

As shown in FIG. 1 the graphics processing system includes three main functional units (processing stages), a vertex shader 20, a tiler 21, and a rasteriser and fragment shader 22. These processing stages use and process data that is stored in various data arrays, and buffers, including an index buffer 23, draw call descriptor 24, a primary attribute descriptor array 25, a vertex buffer (primary attribute array) 26, a secondary attribute descriptor array 27, a varyings buffer (second attribute array) 28, a positions buffer 29, and a polygon list array 30.

(In FIG. 1, the round boxes represents hardware units (processing stages) of the graphics processing system and the rectangular boxes are memory buffers or data structures. The solid arrows show data flow from the processing stages to the memory buffers and data structures, and the dotted arrows are pointers between the memory buffers and data structures (i.e. where one data structure contains a pointer to an entry in a different memory array). It should be noted here that FIG. 1 is only schematic, and that, for example, in practice the shown functional units, such as the vertex shader and the fragment shader, may share significant hardware circuits, even though they are shown schematically as separate stages in FIG. 1.)

The draw call descriptor defines one draw call. (As is known in the art, the "instructions" to the graphics processor to render images for display will be provided to the graphics processor in the form of draw call descriptors which are generated in response to commands from an application running on a host system for graphics display. FIG. 1 shows the operation for a single draw call only, for simplicity. In practice there will be plural draw calls executed, each having a corresponding draw call descriptor, as is known in the art. Where plural draw calls to be executed, each draw call has a descriptor and the draw call descriptors are stored as a linked list of draw call descriptors. Each separate draw call will be treated and processed in the manner of the present embodiment.)

As is known in the art, the draw call descriptor is essentially the starting point for the operation of the vertex shader 20 and tiler 21. The graphics processing unit will receive a command to perform a draw call as specified by the appropriate draw call descriptor, and the vertex shader and tiler will then operate to execute that command.

For the rasteriser/fragment shader 22 operation, the tiler 21 will write a pointer to the draw call descriptor into the polygon lists 30 for each draw call. The rasteriser/fragment shader 22 will then read the pointer in the polygon list array 30 and thereby know which draw call descriptor is associated with each triangle it rasterises and shades.

The index buffer 23 stores the vertex indices for each corner vertex of each polygon (primitive). The positions buffer 29 contains transformed positions as output from the vertex shader 20 (i.e. the positions at which to draw the polygons (graphics primitives), as seen by the viewer).

The vertex shader 20, as is known in the art, takes input data values associated with the vertices, etc., defined for an image to be displayed, and processes those data values to generate a set of corresponding "vertex shaded" output data values for use by subsequent stages of the graphics processing system. The vertex shading, for example, modifies the input data to take account of the effect of lighting in the image.

The tiler 21, as is known in the art, operates to sort the polygons (primitives) for the image being displayed into appropriate polygon lists for each tile of the scene, so that the rasteriser/fragment shader 22 knows which polygons it is to process for the tile that it is currently working on. The tiler 21 reads the draw call descriptor 24, indices from the index buffer 23 and position information from the position buffer 29, and stores in the polygon list array 30 a set of polygon lists, which include, as will be discussed further below, appropriate indices to allow the relevant data associated with the vertices of the polygons in the list to be retrieved.

The rasteriser/fragment shader 22 operates, as is known in the art, to first rasterise the polygons in the image to be displayed into individual graphics fragments which are the graphics entities that are then subsequently shaded in order to display the image, and then performs various fragment shading operations on the rasterised fragments to generate the final, to be displayed, versions of the fragments, which it then stores, for example, in appropriate tile buffers for output, for example, to a frame buffer for display.

As is known in the art, the vertex shader 20 executes a vertex shader program that has a plurality of input variables and generates a set of output variables. The input and output variables are known as attributes and represent variables (attributes) such as colour, position, texture coordinate, etc., of vertices, etc. of an image that is being processed. Each output attribute of the vertex shader 20 is an input attribute (variable) to the fragment shader 22, and for each shader program (linked vertex shader and fragment shader) there is a fixed number of vertex shader input attributes (variables) and a fixed number of vertex shader output/fragment shader input attributes (variables).

In the present embodiment, the input attributes of the vertex shader are and will be referred to as "primary attributes", and the output attributes of the vertex shader will be and are correspondingly referred to as "secondary attributes". (The vertex shader output attribute values are also referred to as "varyings" (as shown in FIG. 1).)

In the present embodiment, each attribute is assigned an attribute index by the shader compiler.

The vertex shader 20 processes the input, primary attribute values to generate desired output, vertex shaded, secondary attribute values, based on the draw call descriptor 24. As is known in the art, each vertex shader output (secondary) attribute may depend on one or more vertex shader input (primary) attributes. It may also depend upon one or more per draw call inputs (which will be constant for a given draw call).

For a particular draw call, each primary (vertex shader input) attribute will have a value for each vertex of the draw call, or in the case of instanced drawing, a value either for each vertex, or for each instance. The secondary attributes (vertex shader output attributes) will have a value for each separate vertex/instance combination.

(As is known in the art, the case of "instanced mode" operation, a given vertex may be processed multiple times, once for each required "instance" of that vertex. In this case it may be, for example, that for a particular instance of the vertex in question, the vertex shader will use an input attribute value that is associated with that instance when it processes a vertex attribute.)

Thus there may be some input variables to the vertex shader (primary attributes) whose values are defined in respect of and for particular "instances", as well as primary attributes whose values are defined on a "per-vertex" basis.

A given output attribute (secondary attribute) of the vertex shader may depend only on one or more input attributes (primary attributes) whose values are defined for each vertex (are defined on a per-vertex basis), or may depend only on one or more input attributes (primary attributes) whose values are defined for each instance (are defined on a per-instance basis), or may depend both on one or more per-vertex input attributes (primary attributes) whose values are defined for each vertex and on one or more per-instance input attributes (primary attributes) whose values are defined for each instance. As discussed above, in addition to its dependence on one or more vertex shader input attributes (primary attributes), a vertex shader output attribute (secondary attribute) may also depend on one or more per draw call inputs. A secondary attribute may also be a constant (have a constant value).

The attribute values are stored in memory buffers called attribute arrays, which are indexed in the present embodiment either by the vertex index, the instance index, or by an output, unfolded index (which will be discussed further below).

Thus, as shown in FIG. 1, the input (primary) attribute values (the values for each vertex shader input attribute for the draw call in question) are stored in a primary attribute array (vertex buffer) 26.

The primary attribute values (the values for the input attributes for the vertex shader) will, as is known in the art, be generated by and come from the application that requires the graphics processing, and be stored appropriately in the primary attribute array (vertex buffer) 26 for use by the graphics processing system.

The layout of the primary attributes values (the vertex shader input attribute values) in the primary attribute array, and how they are distributed into one or more memory buffers, is determined and controlled by the application (that is triggering the graphics processing). In the present embodiment, the primary attribute values may be, e.g., interleaved into two buffers, according to whether they are defined on a per-vertex or a per-instance basis, e.g. as follows:

Primary attribute buffer 1:
Value of attribute 0 for vertex 0
Value of attribute 1 for vertex 0
Value of attribute 0 for vertex 1
Value of attribute 1 for vertex 1
and so on.
Primary attribute buffer 2:
Value of attribute 2 for instance 0
Value of attribute 3 for instance 0
Value of attribute 2 for instance 1
Value of attribute 3 for instance 1
and so on.

To read the values in this array, a buffer base address representing the start position of the per-vertex defined values or the per-instance defined values is used (depending on whether the attributes are defined for vertices or for instances), and then the relevant vertex index or instance index is used to index from that base address to the desired attribute value. (This process will be discussed in more detail below.)

Other arrangements, such as using a different memory buffer for each attribute (i.e. such that each attribute has its own memory buffer, separate from the other attributes), would be possible, if desired. The technology described herein supports all such arrangements.

The outputs of the vertex shader 20 (the vertex-shaded output (secondary) attribute values) are correspondingly stored in an output secondary attribute array 28.

The layout of the secondary attribute values (the values of the outputs of the vertex shader) in the secondary attribute array 28 is determined and controlled by the driver for the graphics processor. Again, the attribute values are, in this embodiment, interleaved into one memory buffer (the secondary attribute array 28) as this will give better cache performance.

As will be discussed further below, in the present embodiment the secondary attribute values are grouped in the secondary attribute array 28 according to the nature of the vertex shader input (primary) attributes on which they depend (and in particular whether they depend only on per-vertex dependent input attributes, or only on per-instance dependent input attributes, or on both per-vertex dependent and per-instance dependent vertex shader input attributes).

Thus, all the secondary attribute values that depend only on per-vertex only dependent primary attributes are grouped together, starting at a particular buffer base address and indexed in relation to that address by the vertex index for the corresponding input attribute value, all the secondary attribute values that depend only on per-instance only dependent primary attributes are grouped together, starting at a particular buffer base address and indexed in relation to that address by the instance index for the corresponding input attribute value, and all the secondary attribute values that depend on both per-vertex and per-instance dependent primary attributes are grouped together, starting at a particular buffer base address and indexed in relation to that address by the vertex/instance combination for the corresponding input attribute values (by means of an "unfolded" index, as will be discussed further below).

Again, to read the values in this array, the appropriate buffer base address representing the start position of the per-vertex indexed set of values, or of the per-instance indexed set of values, or of the vertex/instance combination indexed set of values, is used (depending on whether the attributes are defined for vertices or for instances or for vertex/instance combinations), and then the relevant vertex index, instance index, or combined vertex/instance index, is used to index from that base address to the desired attribute value. (This process will be discussed in more detail below.)

In the present embodiment, each attribute (primary and secondary) of the vertex shader 20 has an associated "attribute descriptor".

Each attribute descriptor contains the following fields:
- the memory address of the buffer containing the values for the attribute (the buffer address of all the interleaved, commonly indexed, attribute values is set to point to the same memory buffer—this is the buffer base address referred to above)
- the offset into the buffer for the value of the attribute for the first "index" entry in the buffer (i.e. for the first vertex, vertex 0, where the attribute values are interleaved on a per-vertex basis (in which case the offset for each attribute is the offset into the data block for each vertex at which to find the value (data) for that attribute for the vertex in question), or for the first instance, instance 0, where the attribute values are interleaved on a per-instance basis, and so on).
- the stride, being the distance in memory from the value of the attribute for one indexed entry (e.g. vertex) to the value of the attribute for the next indexed entry (e.g. vertex). (The stride for the interleaved attribute values is thus set to the sum of the sizes of all the attribute values for a given indexed entry (vertex or instance or vertex/instance combination) (i.e. the sum of the sizes of the data for each attribute). This can be inferred from the storage type field described below.)
- the storage type for the attribute value (indicating the component data type and number of components)—the load and store instructions may perform a data format conversion based on the data type specified in the attribute descriptor
- the attribute array type (linear, divisor or modulus)—this will be explained further below
- if a divisor attribute array type (a divisor attribute), a divisor value
- if a modulus attribute array type (a modulus attribute), a modulus value
- if a divisor or modulus attribute, a write reduction flag (divisor and modulus attributes will be discussed further below).

The attribute descriptors are grouped into attribute descriptor arrays, indexed by the corresponding attribute index. The attribute descriptors for the vertex shader input (primary) attributes are stored in a primary attribute descriptor array 25, and the attribute descriptors for the vertex shader output (secondary) attributes are stored in a secondary attribute descriptor array 27. The attribute descriptors are generated by the graphics processor driver at draw call time.

As for any given shader program there will be a fixed number of vertex shader input (primary) and output (secondary) attributes (variables), for any particular shader program, there will correspondingly be a fixed number of attribute descriptors (and so the attribute descriptor arrays will have a fixed size), independent and irrespective of the number of vertices and instances being drawn for a given draw call.

In operation of the present embodiment, when an application that requires graphics processing is started, the relevant shader programs will first be compiled.

Thus, the vertex shader compiler will run to generate an appropriate set of commands for the vertex shader 20 to cause the vertex shader 20 to process the primary attribute values in the desired manner. As part of this process the vertex shader compiler will generate appropriate load attribute instructions and store attribute instructions for the vertex shader 20 to cause the vertex shader to load the relevant primary attribute values for processing from the primary attribute array 26, and to store the generated secondary attribute values in the secondary attribute array 28, respectively.

Similarly, the fragment shader, etc., will also be compiled, and thus load attribute (varying) instructions will, inter alia, also correspondingly be generated for the fragment shader 22.

In the present embodiment, similar forms of attribute load and store instruction are used for both the vertex shader 20 and the fragment shader 22. Each such attribute load or store instruction provided to the shaders indicates which attribute descriptor array (primary or secondary) the relevant attribute descriptor should be read from, an index to allow the relevant attribute descriptor to be retrieved, and an index or indices to be used when determining the memory address for the attribute value itself, by having access to the following pieces of information:
- an array selector, which indicates whether to use the primary or secondary attribute descriptor array. This is encoded into the instruction.
- the attribute index (i.e. the index of the attribute in question, as discussed above). This may be encoded into the instruction, or a value encoded into the instruction plus a value in a register.
- an unfolded index or indices.

The unfolded index that is used for the attribute load and store instructions is derived from the vertex index and instance index (if present) of the respective vertex and instance to which the attribute value in question relates, as follows:

$$\text{unfolded index}=(\text{vertex index})+(\text{instance index})\times(\text{padded instance size}).$$

The padded instance size in this formula is a value which is greater or equal to the number of vertices per-instance, but is also set to a value, as will be discussed further below, which makes it efficient to perform modulus operations with it in hardware.

The vertex shader 20 derives the unfolded index it is to use directly, using the above formula, from the vertex index and the instance index for the vertex shader thread in question. (For vertex shader operation, the draw call descriptor contains the number of vertices and instances to shade and tile, a vertex shader thread is run for each vertex/ instance combination, and each thread internally knows its vertex index and instance index.)

In the case of fragment shader operation, as will be discussed further below the tiler 21 calculates the unfolded index using the above formula and writes it into the polygon lists 30 (for the vertex in question). The fragment shader then reads the unfolded index directly from the polygon lists 30.

Using an unfolded index of this form provides a form of index that can straightforwardly take account of the fact that instanced mode operation in effect "blows up" or "unfolds" the input attribute values (the primary attribute array) that contains either one value for each attribute per-vertex or one value for each attribute per-instance, into an output, vertex shaded, attribute value array (the secondary attribute array) that should contain one attribute value (secondary attribute value) per-vertex per-instance (i.e. for each different vertex and instance combination).

Moreover, this unfolded index value can be used to derive the original input vertex index of the input attribute value by carrying out a modulus operation with the modulus value equal to the padded instance size. Similarly, the original, input instance index of the input attribute value can be derived by performing a division operation using a divisor value equal to the padded instance size. This accordingly means that the input vertex index or instance index can be relatively straightforwardly derived from the unfolded index that is used for the load or store attribute instruction. This arrangement thus has the advantage that the output index that is provided to the fragment shader 22 can also be used by the fragment shader to revert to the appropriate input vertex index or instance index when that is required (as will be discussed further below).

In order to trigger the derivation of the appropriate input vertex index or instance index from the unfolded index, when that is required, two special kinds of attribute descriptors (as mentioned above) are used:

i) Divisor attributes which divide the unfolded index by a value given in the attribute descriptor before indexing into the attribute array. The divisor value d is represented by three numbers, r, p and q, calculated thus:

$r = \text{floor}(\log 2(d))$ $f0 = 2^{r-32} + \text{floor}(d/2)$ $fi = \text{floor}(f0/d)$ $ff = f0 - fi * d$ $p = fi - 2^{31}$ $q = (ff > \text{floor}(d/2)) ? 1 : 0$ and the division on the index u is then calculated as $i = (u+q)*(p+2^{31})/2^{r+32}$ (The use of a divisor value of this form allows for a simpler division circuit than fully general division to be used.)

ii) Modulus attributes which perform a modulus of the unfolded index by a value given in the attribute descriptor before indexing into the attribute array. The modulus value (i.e. the padded instance size, Spi) has the form $Spi = (2p+1)*2^r$ where $p$ is 0,1,2,3 or 4

(The use of a modulus value of this form allows a simpler modulus circuit than fully general modulus to be used.)

As discussed above, an indication of whether the attribute is a divisor attribute (in which case the unfolded index should be divided by a value given in the attribute descriptor before indexing into the attribute array), or a modulus attribute (in which case a modulus of the provided unfolded index value by a value given in the attribute descriptor should be performed before indexing into the attribute array), is included in the relevant attribute descriptor for the attribute in question, together with the relevant divisor or modulus value (i.e. in this case the padded instance size).

Where the API mechanism for instancing allows per-instance inputs to have a further divisor value on the instance index for specific attributes, then that further divisor may be simply multiplied onto the divisor value for those attributes. In that case the attribute descriptor should indicate the appropriate divisor value to be used.

In response to such a load or store attribute instruction, the shader will first read the attribute descriptor from the array (primary or secondary) indicated by the array selector in the instruction, at the index indicated by the attribute index indicated by the instruction.

It will then determine the memory location (address) from which to read the attribute value to use (for a load instruction), or at which to store the generated attribute value (for a store instruction). This is done using the unfolded index indicated by the instruction, and the buffer address, the attribute array type, the offset and stride, and (if relevant) the divisor or modulus value, in the read attribute descriptor.

The memory address of the attribute value (data) to load will then be derived as:

address of attribute value=(buffer address)+offset+ (stride×index).

The buffer address, stride and offset in the above equation are given in the relevant attribute descriptor, as discussed above.

The index is the unfolded index, the vertex index, or the instance index, as appropriate, as discussed above, and will be determined in accordance with the attribute array type indicated in the attribute descriptor. For a linear attribute, the index to use will be the unfolded index, but for a divisor attribute the above division operation will be used to derive the instance index from the unfolded index, and for a modulus attribute, the above modulo operation will be used to derive the vertex index from the unfolded index.

Store attribute instructions operate in the same way, but the shader operates to store the data at the determined address.

Thus, when the vertex shader 20, for example, executes an appropriate load attribute instruction to process a vertex shader input attribute value, it identifies the attribute descriptor array to be read from the array selector field in the load attribute instruction (which in this case will indicate the primary attribute descriptor array). It then uses the attribute index in the load attribute instruction to read the corresponding primary attribute descriptor from the primary attribute descriptor array 25. It then uses the relevant information in the primary attribute descriptor together with the unfolded index to retrieve the appropriate vertex shader input (primary) attribute value to be processed.

(As discussed above, the input (primary) attribute values in the primary attribute array will be accessed by the vertex shader 20 using either a vertex index or an instance index. An instance index is used to retrieve input (primary) attribute values that are defined on a per-instance basis, and a vertex index is used to retrieve input (primary) attribute values that are defined on a per-vertex basis.)

Similarly, save for the particular cases that will be discussed in more detail below, once the vertex shader 20 has processed an input (primary) attribute value, it will then store its output, i.e. the generated secondary attribute value, in the secondary attribute array 28 as indicated by the corresponding attribute store instruction (and the information in the relevant secondary attribute descriptor in the secondary attribute descriptor array 27).

The basic compiling operation of the graphics processing system is modified in the present embodiment to take account of two special cases of vertex shading operation.

Firstly, the vertex shader compiler is configured to, when it compiles the vertex shader code, determine for each vertex shader output attribute (secondary attribute) whether that output attribute is a direct copy from a vertex shader input attribute (i.e. to identify a "pass-through" situation where the value of the vertex shader output attribute will be a direct copy of the value of an input attribute). This could be the case, for example, where the vertex shader input attribute (primary attribute) is a texture coordinate.

When this is determined to be the case, the vertex shader compiler omits the code to perform the copy operation and instead records in meta-information associated with the vertex shader code that the particular vertex shader output (secondary) attribute is a direct copy of the particular vertex shader input (primary) attribute and which vertex shader input (primary) attribute it is a copy of.

The mechanism for identifying the situation where a vertex shader output attribute value is to be a copy of a vertex shader input attribute value is configured and constructed in the present embodiment so as to give a conservative result, i.e. to "err on the safe side". Thus, in the present embodiment, the arrangement is such that any error in recognising the situation where a vertex shader output attribute value is to be a copy of a vertex shader input attribute value should be such that the system will fail to detect where that is the case, rather than determining that a "pass-through" situation exists where in fact it does not.

Accordingly, references to operation of the present embodiment in a particular manner where a "pass-through" attribute or situation has been identified (i.e. where it has been determined that the vertex shader output attribute value is to be a copy of a vertex shader input attribute value) refer to those situations where the system, e.g., compiler, has identified a "pass-through" situation.

Secondly, the vertex shader compiler also records in meta-information which input (primary) attributes each output attribute of the vertex shader (each secondary attribute) depends on.

As discussed above, in the present embodiment the mechanism for identifying the input attributes that a vertex shader output attribute is dependent upon is configured and constructed so as to give a conservative result, i.e. to "err on the safe side". Thus, the arrangement is such that any error in identifying the input attributes that a vertex shader output attribute depends on should be such that the system will conclude (determine) that a vertex shader output attribute depends on some input attribute that it does not in fact depend on (i.e. to give a determined set of input attribute dependencies that is a superset of the actual dependencies), rather than missing a dependency of the output attribute that the output attribute does actually depend on.

It should also be noted here that, again, accordingly, references to operation of the technology described herein in a particular manner where a vertex shader output attribute has been identified as depending solely on per-vertex or solely on per-instance defined vertex shader input attributes, refer to those situations where the system has identified such a situation (such a vertex shader output attribute). Similarly references to the dependencies of a given vertex shader output attribute on given vertex shader input attributes refer to those dependencies as identified by the system of the technology described herein (e.g. the compiler), unless the context requires otherwise.

Thirdly, the shader linker operation is configured so that when it sees meta-information associated with the vertex shader code to indicate that a particular vertex shader output (secondary) attribute is a direct copy of a particular vertex shader input (primary) attribute (i.e. there is a "pass-through" attribute), it then modifies the fragment shader code to cause the rasteriser/fragment shader 22 to read the appropriate primary (vertex shader input) attribute value instead of reading a secondary (vertex shader output) attribute value. (As is known in the art, the shader linker effectively operates to match all outputs of the vertex shader to corresponding inputs for the fragment shader. This operation is modified in the present embodiment to, where the meta-information from the vertex shader indicates that a "pass-through" attribute exists, connect the fragment shader input to a vertex shader input instead (namely the vertex shader input specified by the "pass-through" meta-information).)

To do this, the shader linker when it sees the meta-information from the vertex shader compiler indicating that there is a "pass-through" attribute, modifies the fragment shader code to set the array selector field in the appropriate load instruction for the rasteriser/fragment shader 22 to indicate that the rasteriser/fragment shader 22 should read from the primary attribute descriptor array 25 (i.e. from the input attribute descriptor array for the vertex shader), rather than from the secondary attribute descriptor array 27 (i.e. the output attribute descriptor array of the vertex shader), and changes the attribute index in the instruction to indicate the primary (input) attribute which the pass-through attribute is a copy of In other words, the shader linker modifies the fragment shader load attribute (load varying) instruction to cause the fragment shader to read the relevant primary attribute descriptor (which will then trigger the fragment shader to read the relevant primary attribute value in the primary attribute array), by setting the array selector field and attribute index in the load attribute instruction accordingly (i.e. to indicate the primary attribute descriptor array and the primary (input) attribute that the "pass-through" attribute is a copy of).

Once the shader programs have been compiled (and modified by the linker, if necessary), the application requiring the graphics processing loads the appropriate indices into the index buffer 23 and the vertex attribute values into the vertex buffers (primary attribute array) 26. This is done prior to any draw calls using the indices and attribute values in question, although not necessarily immediately before each draw call. The application also specifies all parameters of the draw call, such as which buffers to draw from and how much, which shaders to use, etc., via the graphics API.

The driver for the graphics processor then creates the draw call descriptor for the draw call in question and the relevant attribute descriptors (this will be discussed in more detail below), and passes these to the graphics processor.

As discussed above, as part of the process, in the present embodiment the driver for the graphics processes generates and stores the necessary primary and secondary attribute descriptors based on the draw call descriptor for the draw call in question. This is done at draw call time because the per-vertex or per-instance dependent status of the input (primary) attributes is specified by the application for each draw call.

Thus, for the primary attributes, the driver will generate an attribute descriptor for each primary attribute for the draw call, to allow the vertex shader and other graphics processing stages (shaders, etc.), to access the relevant primary attribute values using the mechanisms described above.

Per-vertex dependent primary (input) attributes (i.e. primary attributes whose values are defined on a per-vertex basis) will be defined by the driver (in the relevant attribute descriptor) as modulus attributes, with a modulus value equal to the padded instance size, and per-instance dependent primary (input) attributes (i.e. primary attributes whose values are defined on a per-instance basis) will be defined as divisor attributes with a divisor value equal to the padded instance size. (If desired, per-instance dependent primary attributes could be defined as divisor attributes with a divisor value equal to the padded instance size multiplied by any defined instance divisor. In this case one primary attribute value buffer would be required per instance divisor (whereas just one buffer for all per-instance inputs will suffice if just the padded instance size is used).)

The driver will similarly generate a secondary attribute descriptor, for each secondary attribute that is to be generated for the draw call, to allow the vertex shader to store the secondary attribute values, and the other shaders, etc., to access the secondary attribute values using the mechanisms described above.

To do this, the driver, for each respective vertex shader output (secondary) attribute to be generated, goes through the vertex shader input (primary) attributes that affect that output attribute (as recorded by the vertex shader compiler) at draw call time, to determine if all the vertex shader input (primary) attributes for the output (secondary) attribute are defined on a per-vertex basis, on a per-instance basis, or there is a mixture of the two. (In other words, the driver goes through all the vertex shader output attributes at draw call time to classify each output (secondary) attribute on the basis of what kind of vertex shader input (primary) attributes it depends on, i.e. whether it depends only on per-vertex defined input attributes, or only on per-instance defined input attributes, or on both per-vertex and per-instance defined input attributes, or on no vertex shader input attributes at all (i.e. it is a constant).)

The driver then writes (stores) an appropriate secondary attribute descriptor in the secondary attribute descriptor array 27 for each secondary attribute (vertex shader output attribute) accordingly.

Where a vertex shader output attribute (a secondary attribute) depends on both per-vertex and per-instance defined vertex shader input attributes, the driver stores a secondary attribute descriptor in the secondary attribute descriptor array 27 indicating a linear attribute and pointing to (i.e. including the buffer address of) the attribute values in the secondary attribute array 28 that are indexed using the unfolded output index (i.e. on the basis of the input vertex/instance combination on which they depend).

Where a vertex shader output attribute (a secondary attribute) depends on per-vertex only dependent (defined) vertex shader input (primary) attributes, the driver stores a secondary attribute descriptor in the secondary attribute descriptor array 27 indicating a modulus attribute with a modulus value equal to the padded instance size, and pointing to (i.e. including the buffer address of) the part of the secondary attribute array 28 that is indexed on a per-vertex basis.

Where a vertex shader output attribute (a secondary attribute) depends on per-instance only dependent (defined) vertex shader input (primary) attributes, the driver stores a secondary attribute descriptor in the secondary attribute descriptor array 27 indicating a divisor attribute with a divisor value equal to the padded instance size and pointing to (i.e. including the buffer address of) the part of the secondary attribute array 28 that is indexed on a per-instance basis. (Again, if desired, per-instance only defined vertex shader input attribute dependent secondary attributes could use divisor attributes with a divisor value equal to the padded instance size multiplied by any defined instance divisor. In this case one secondary buffer would be required per instance divisor (whereas just one buffer for all per-instance outputs will suffice if just the padded instance size is used).)

Thus output (secondary) attributes that depend only on per-vertex only defined vertex shader input attributes are defined as modulus attributes and output (secondary) attributes that depend only on per-instance only defined vertex shader input attributes are defined as divisor attributes. (It should be noted here that, as discussed above, references here and elsewhere to the vertex shader output (secondary) attributes depending only on per-vertex only (or only on per-instance only) defined vertex shader input attributes refer to that being the case in respect of all the vertex shader input (primary) attributes on which the vertex shader output (secondary) attribute depends—the vertex shader output (secondary) attribute can also depend on other values, such as per draw call inputs, and referring to a vertex shader output (secondary) attribute as depending only on per-vertex only (or only on per-instance only) defined vertex shader input attributes does not preclude the vertex shader output (secondary) attribute depending on such other inputs, such as per-draw call inputs, as well.)

The driver also includes a "write reduction" flag in the modulus and divisor secondary attribute descriptors, with these semantics:

A modulus attribute will only perform the write if the unfolded index divided by the modulus value (rounded down) is zero. This is equivalent to:

$$u < Spi$$

(where Spi is the padded instance size) and means that a modulus attribute will not store the output value if the unfolded index is greater than or equal to the modulus value.

A divisor attribute will only perform the write if the unfolded index modulo the divisor value is zero. This is equivalent to:

rem=bits shifted out of final shift in divisor calculation
lz=count leading zeros(rem)
condition: lz>r OR (lz==r AND q==1)
and means that a divisor attribute will not store the output value if the unfolded index is not divisible by the divisor.

In operation, when the vertex shader executes a store attribute instruction, it will, as discussed above, check the corresponding secondary attribute descriptor indicated by the store attribute instruction, and if the write reduction flag is present perform the appropriate one of the above tests (depending upon whether the attribute is a modulus attribute or a divisor attribute), and if the test is passed, store the appropriate output value, but if it is failed, abort the store operation.

The result of this is that per-vertex only vertex shader input attribute dependent output attribute values are only written for instance 0, and per-instance only vertex shader input attribute dependent output attribute values are only written for vertex 0.

The effect of this is that where a vertex shader output attribute (secondary attribute) that depends only on per-vertex defined or only on per-instance defined vertex shader input attributes is identified (i.e. the vertex shader input attributes on which the output attribute depends are defined solely on a per-vertex or solely on a per-instance basis—they may also depend, as discussed above, on per draw call inputs, for example) (and there is not a "pass-through" situation as discussed above), then the vertex shader 20 will operate to store only one copy of each different version of that output (secondary) attribute value that is to be generated (i.e. it stores one copy of the output value for each different input vertex or for each different input instance, as appropriate, irrespective of how many instances or vertices, respectively, the output (secondary) attribute value actually applies to). Thus, for example, even if there are plural instances that a given per-vertex only vertex shader input attribute dependent vertex shader output value (secondary attribute value) should be generated for, the vertex shader 20 will only store one copy of that output value (secondary attribute value) per vertex.

Thus, each such output value will only be written once in the secondary attribute array 28.

To take account of the fact that the per-vertex only or per-instance only vertex shader input attribute dependent output attribute values are stored as single copies for each vertex or instance, respectively, in the secondary attribute array 28, the secondary attribute values in the secondary attribute array are, as discussed above, grouped according to their dependence relation (per-vertex, per-instance, or both) (since such attributes will have a different number of attribute values (per-attribute) in them).

Thus the per-vertex only vertex shader input attribute dependent output (secondary) attribute values are grouped together and indexed (relative to a base buffer address (which is included in the relevant secondary attribute descriptors)) according to the vertex index of the relevant vertex. Similarly, the per-instance only vertex shader input attribute dependent output (secondary) attribute values are grouped together and indexed (relative to a base buffer address) according to the instance index of the relevant instance. Any per-instance and per-vertex vertex shader input attribute dependent output (secondary) attribute values are also grouped together and indexed (relative to a base buffer address) according to the unfolded index discussed above.

The secondary attribute descriptors are then configured accordingly by the graphics processor driver, in the manner discussed above (i.e. to define each secondary attribute as a linear, modulus or divisor attribute, with the corresponding buffer base address), to ensure that the vertex shader will store the secondary attribute values it generates in the appropriate place, and that the subsequent graphics processing stages, such as the fragment shader, will load the appropriate secondary attribute values when they are to process the secondary attributes.

Once the driver has generated the appropriate attribute descriptors, the draw call can then be processed. Thus the vertex shader will launch a thread for each vertex/instance combination and execute the appropriate load attribute instructions to load the primary attribute values for processing, and store generated secondary attributes according to its store attribute instructions, following the procedures discussed above.

Thus, as discussed above, when the vertex shader 20, for example, executes an appropriate load attribute instruction to process a vertex shader input attribute value, it will identify the attribute descriptor array to be read from the array selector field in the load attribute instruction (which in this case will indicate the primary attribute descriptor array). It will then use the attribute index in the load attribute instruction to read the corresponding primary attribute descriptor from the primary attribute descriptor array 25. It will then use the relevant information in the primary attribute descriptor together with the unfolded index to retrieve the appropriate vertex shader input (primary) attribute value to be processed.

Similarly, once the vertex shader 20 has processed an input (primary) attribute value, it will then store its output, i.e. the generated secondary attribute value, in the secondary attribute array 28 as indicated by the corresponding attribute store instruction (and the information in the relevant secondary attribute descriptor in the secondary attribute descriptor array 27).

Once the vertex shader 20 has vertex-shaded all the vertices appropriately, the tiler 21 then generates the necessary polygon lists and stores them in the polygon list array 30, ready for use by the rasteriser/fragment shader 22.

As part of this process, the tiler 21 includes in the polygon lists 30 the unfolded index for each corner vertex.

As discussed above, this unfolded index that is included in the polygon lists 30 for provision to the rasteriser/fragment shader 22 is derived (calculated) by the tiler 21 from the vertex index and the instance index (if present) used to index into the primary attribute array 26 for the corresponding vertex shader input (primary) attribute value(s) to the vertex shader 20 (i.e. from the vertex index and the instance index of the vertex and instance whose primary attribute values were used to generate the secondary attribute values for the vertex shaded vertex).

The tiler 21 operates to generate the unfolded indices that are included in the polygon lists 30 in this way even if the graphics processing system is not operating in instanced mode, as running in non-instanced mode is essentially equivalent to simply drawing instance "0" (and not having any per-instance attributes), so the same output index generation mechanism can be used (and in this case will produce an unfolded index that is equal to the input vertex index).

Once the tiler 21 has prepared the polygon lists 30, the rasteriser/fragment shader 22 will work its way through those lists, in order to generate the appropriately shaded fragments to allow the image to be displayed.

In normal operation, in order to do this, the rasteriser/fragment shader 22 will load the appropriate vertex shaded output (secondary) attribute values from the secondary attribute array 28, in accordance with the load attribute (varying) instructions it receives.

Thus, as discussed above, when the fragment shader 22 executes an appropriate load attribute instruction to process an appropriate attribute value, the fragment shader 22 will use the attribute array indication in the load attribute instruction to determine whether to read from the primary attribute descriptor array, or from the secondary attribute descriptor array. It will then use the attribute index in the load instruction to identify the attribute descriptor in the relevant attribute descriptor array.

In the case of a secondary attribute, the fragment shader 22 will accordingly retrieve the appropriate secondary attribute descriptor from the secondary attribute descriptor array 27 using the provided attribute index, and then use the information from that secondary attribute descriptor together with the relevant unfolded indices in the polygon lists to retrieve the appropriate attribute values (vertex shaded attribute values) from the secondary attribute array 28.

(As will be appreciated by those skilled in the art, because the fragment shader 22 processes fragments that represent particular positions within polygons defined by three vertices (where the polygon is a triangle), the fragment shader 22 will, in practice, for each attribute load instruction it receives, read the relevant attribute descriptor once, but then will perform the remaining steps (deriving the index to use for indexing into the attribute array and computing the address of the attribute value and loading the attribute value from memory) three times, once for each vertex of the current polygon, and then perform an interpolation between the three loaded attribute values (i.e. the stored attribute values for the three vertices) to derive the actual attribute value to be used for the fragment shading operation.)

In the case where there is a "linear" secondary attribute, the rasteriser/fragment shader 22 will accordingly determine from the secondary attribute descriptor that the secondary attribute in question is a linear attribute, and use the relevant unfolded indices from the polygon list 30 and the buffer address, offset and stride in the attribute descriptor to identify and retrieve the appropriate secondary attribute values from the secondary attribute array 28.

In the case where there is a per-vertex or per-instance only vertex shader input attribute dependent secondary attribute, the rasteriser/fragment shader 22 will accordingly determine from the secondary attribute descriptor that the secondary attribute in question is a divisor attribute or a modulus attribute, and use the relevant divisor or modulus operation as indicated by the secondary attribute descriptor together with the unfolded indices from the polygon list 30 and the buffer address, offset and stride in the attribute descriptor, to identify and retrieve the appropriate secondary attribute values from the secondary attribute array 28.

In this way, each time the rasteriser/fragment shader 22 needs to use a copy of the appropriate per-vertex or per-instance only vertex shader input attribute dependent output (secondary) attribute value, it is directed to and able to retrieve the single copy of that output (secondary) attribute value in the secondary attribute array 28.

In the case where the load instruction indicates that a primary attribute (an vertex shader input attribute) value is to be loaded (i.e. there is a "pass-through" situation), then the fragment shader 22 will use the attribute index to look up the corresponding attribute descriptor in the primary attributor descriptor array 25. It will then determine from that attribute descriptor whether the attribute is a divisor or modulus attribute and the appropriate divisor or modulo value to be used. It will then use the divisor or modulo value together with the provided unfolded indices (from the polygon list 30) to calculate the vertex indices or instance indices to be used together with the buffer address, offset and stride in the attribute descriptor to retrieve the relevant attribute values from the primary attribute (the vertex shader input attribute value) array 26.

The fragment shader 22 will then process the attribute values it has loaded appropriately, to generate appropriate fragment-shaded data values for each fragment in question, and store those values, if appropriate, in, e.g., a tile buffer, for subsequent export, e.g., to the frame buffer for display, as is known in the art.

As can be seen from the above, the attribute descriptor mechanism of the present embodiment is used both to express the index calculation, and to express the memory layout, for the attribute values independent of the shader code, and the same mechanism is used to control input and output from the vertex shader, and both the vertex shader and the fragment shader have access to the same descriptors (which allows the pass-through attributes to work without any draw-time involvement).

Furthermore, using attribute descriptors that are separate from the shader code in the manner of the present embodiment allows the same shader code to be used with different sets of attribute descriptors, and means that the shader code does not need to be changed when the parameters controlled by the attribute descriptors change.

FIGS. 2A to 7 illustrate the operation of the present embodiment.

In these figures, the rectangular boxes indicate arrays of data in memory. Where they are joined by dashed lines, they are part of the same array. Where there is space between them, they are different arrays.

The rounded boxes indicate shader code executions. For the vertex shading, there is one execution per box. For the shaders at the right-hand side of the figures (which will typically be fragment shaders, but could be other kinds), there will be many executions for each box, since a vertex can be read by more than one polygon and one polygon can contain many fragments. The arrows indicate data read or written by a shader.

Figure 2A:
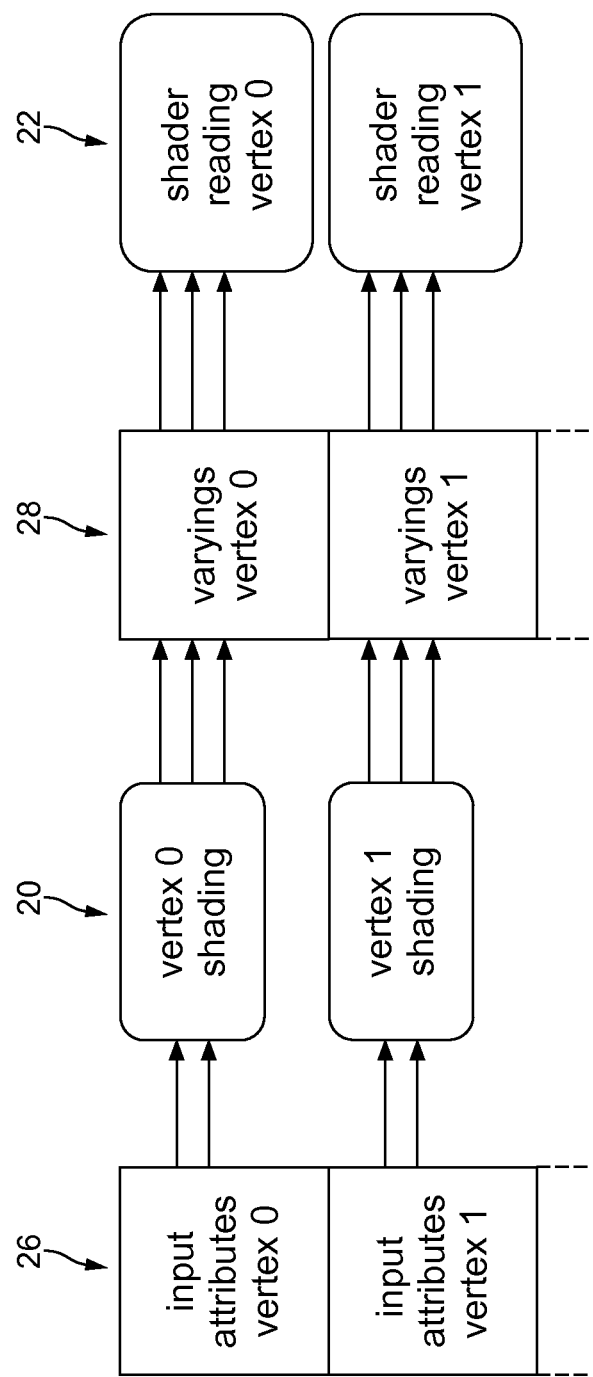
Figure 2B:
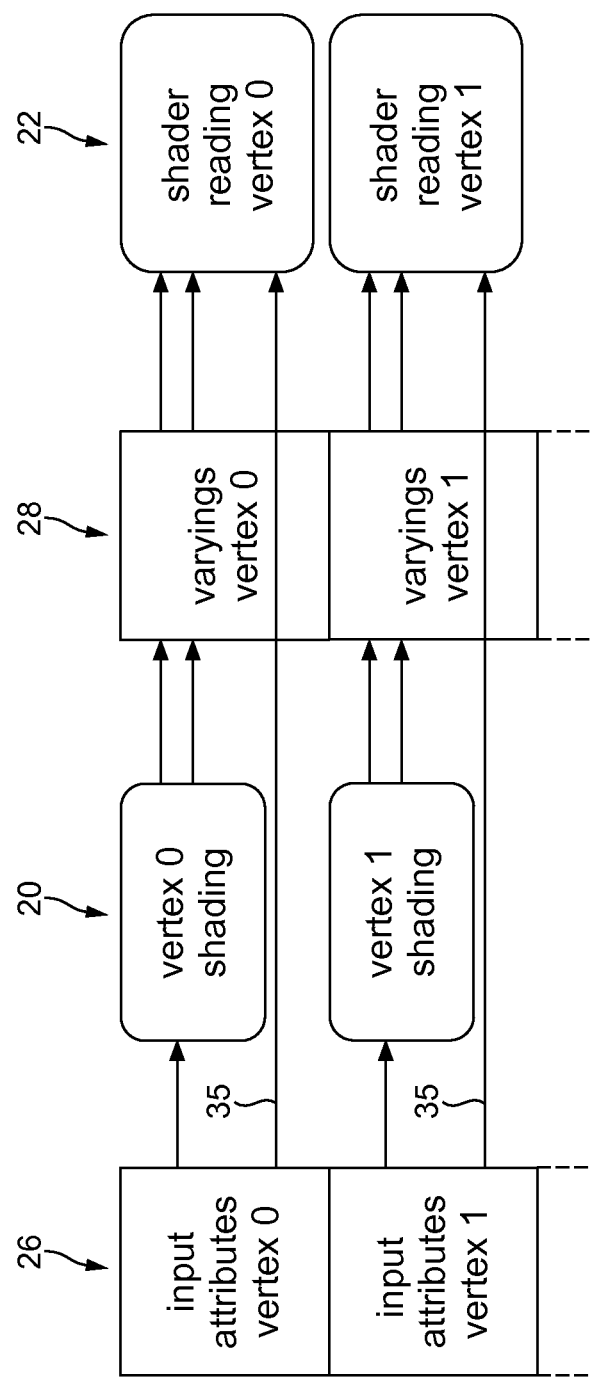
FIG. 2B shows the operation of the embodiment for non-instanced operation where a "pass-through" input attribute has been identified.

FIGS. 2A and 2B show the operation of the embodiment for non-instanced operation. FIG. 2A shows the situation where there is no "pass-through" case identified, whereas FIG. 2B shows the operation where a "pass-through" input attribute has been identified.

As shown in FIG. 2A, the vertex shader 20 will read input attribute values for each vertex from the primary attribute array 26, process those attribute values and store them as output, vertex shaded, attribute values in the secondary attribute array 28, from where they will then be read and processed by the fragment shader 22.

FIG. 2B shows the situation where an output attribute has been identified as a "pass-through" attribute. In this case, as shown in FIG. 2B, the vertex shader 20 does not process that "pass-through" output attribute. The fragment shader 22 instead reads the relevant attribute values directly from the primary attribute array 26, as illustrated by the arrows 35. (It should be noted here that the input (primary) attribute of which a pass-through output (secondary) attribute is a copy could still be read and processed by the vertex shader for other output (secondary) attributes, i.e. where that primary attribute is also needed in the calculation of one or more other (non-pass-through) secondary attributes.)

FIGS. 3 to 7 illustrate the operation of the present embodiment when operating in instanced mode.

Figure 3:
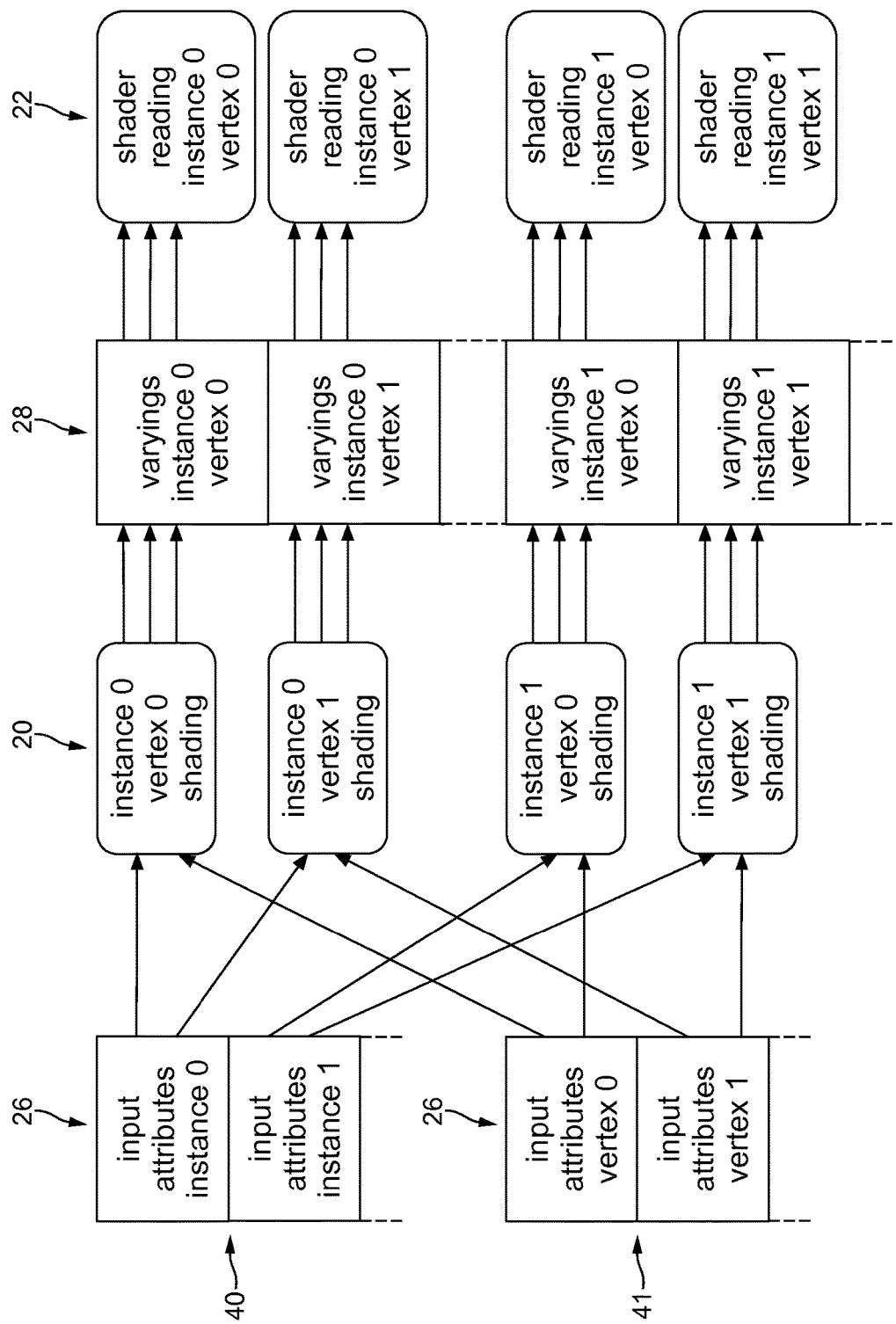

FIG. 3 first illustrates instanced mode operation where there is no "pass-through" or "per-vertex" or "per-instance" input only case identified. (Thus, this in effect, shows "normal" instanced mode operation.)

In this case, as shown in FIG. 3, the input (primary) attribute array 26 is organised as two buffers, one for attributes whose values are defined on a per-instance basis 40 and one for attributes whose values are defined on a per-vertex basis 41. The vertex shader 20 reads from both of these attribute value buffers and, in effect, combines them to provide an output value for each different vertex and instance combination in the secondary (output) attribute array 28 for each attribute. The fragment shader 22 then reads the relevant vertex and instance combination's attribute values from the secondary attribute array 28 as appropriate.

Figure 4:
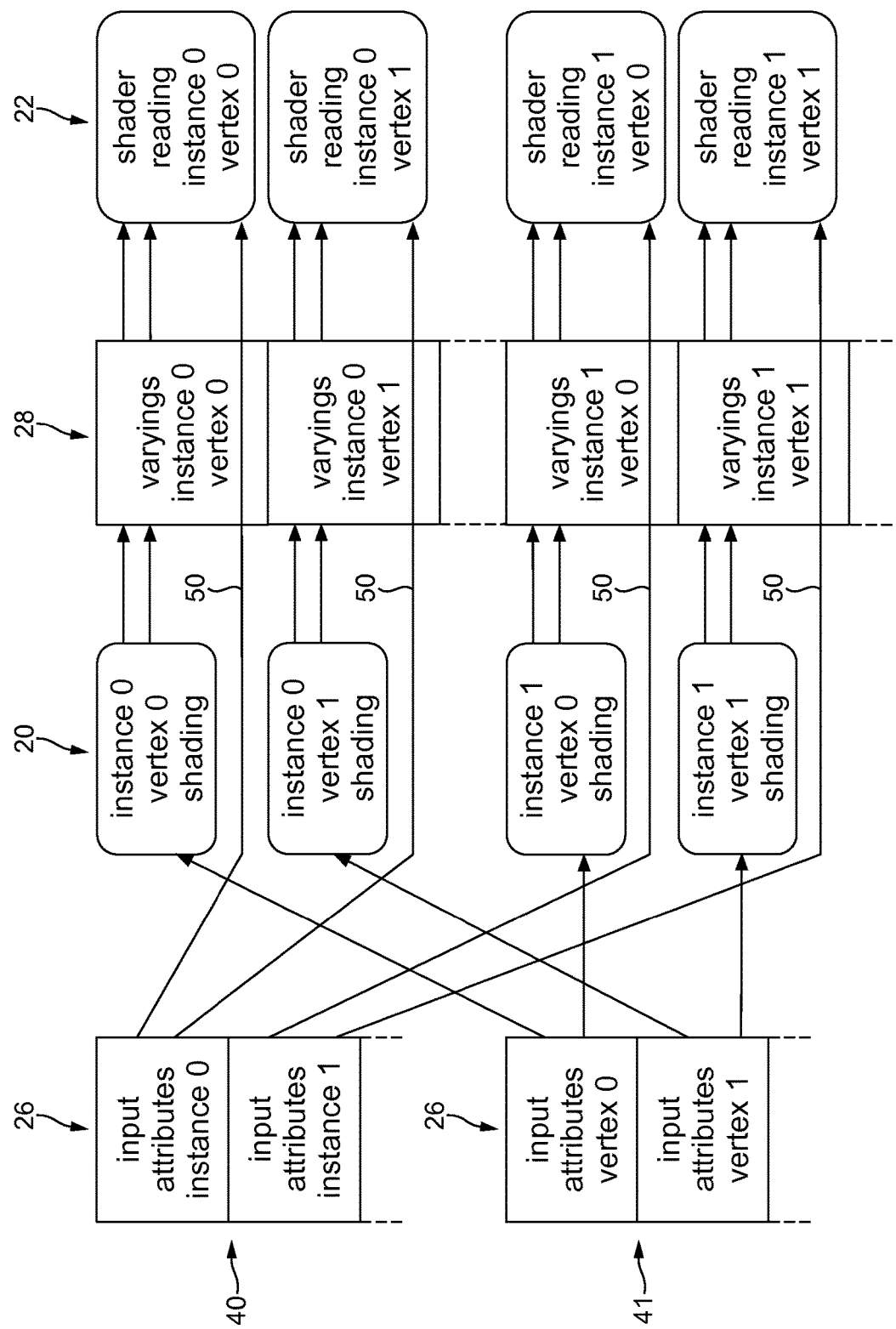

FIG. 4 shows the situation where there is a "pass-through" from a per-instance input attribute. In this case, as shown by the arrows 50 in FIG. 4, the identified "pass-through" per-instance attribute is not processed by the vertex shader 20, but instead the fragment shader 22 will read the per-instance attribute values when it needs them directly from the input per-instance attribute buffer 40 (using the divisor attribute mechanism described above).

Figure 5:
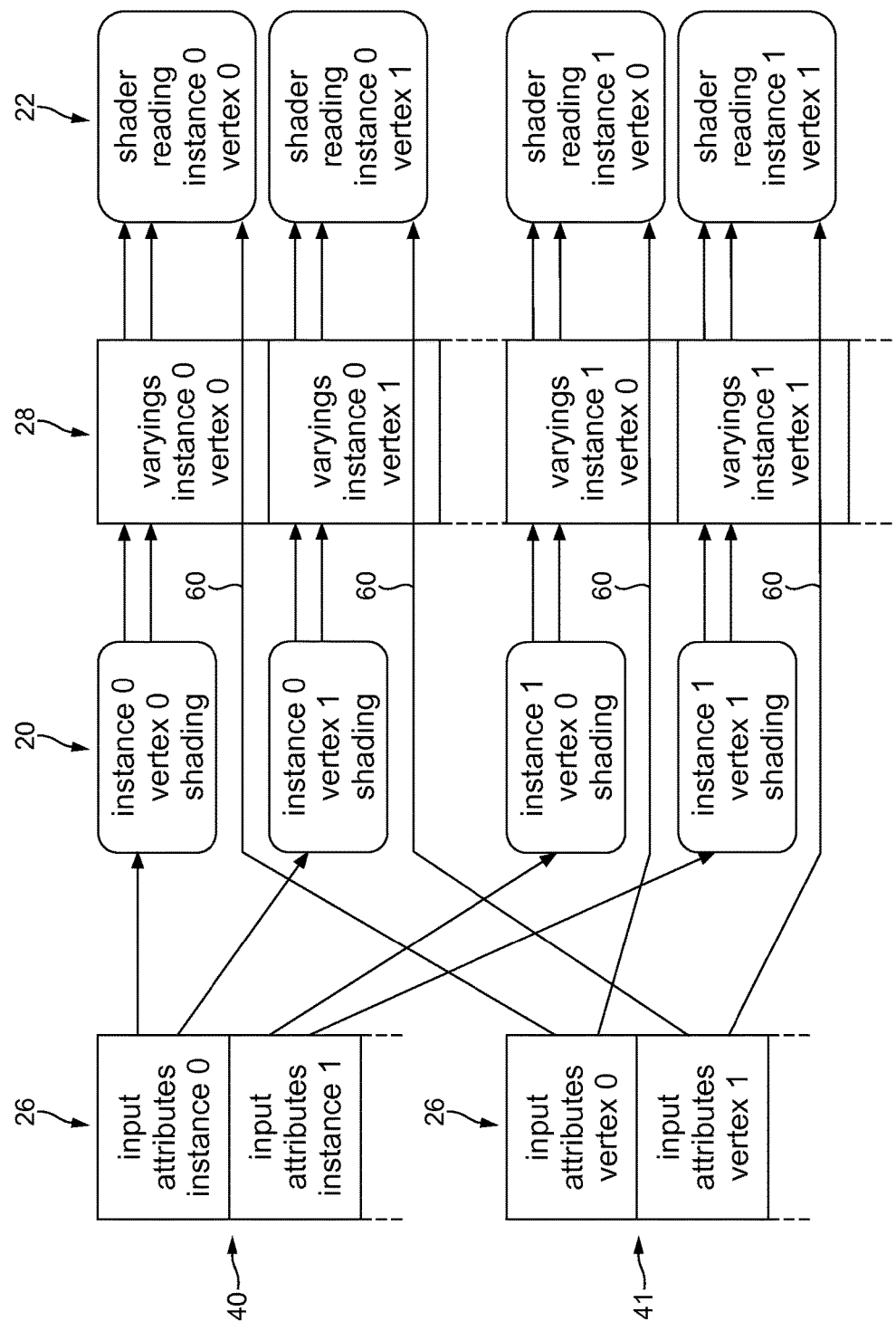

FIG. 5 shows the corresponding case where there is a "pass-through" from a per-vertex attribute. In this case, as shown by the arrows 60 in FIG. 5, the identified "pass-through" per-vertex attribute is not be processed by the vertex shader 20, but instead the fragment shader 22 will read the per-vertex attribute values when it needs them directly from the input per-vertex attributes buffer 41 (using the modulus attribute mechanism described above).

Figure 6:
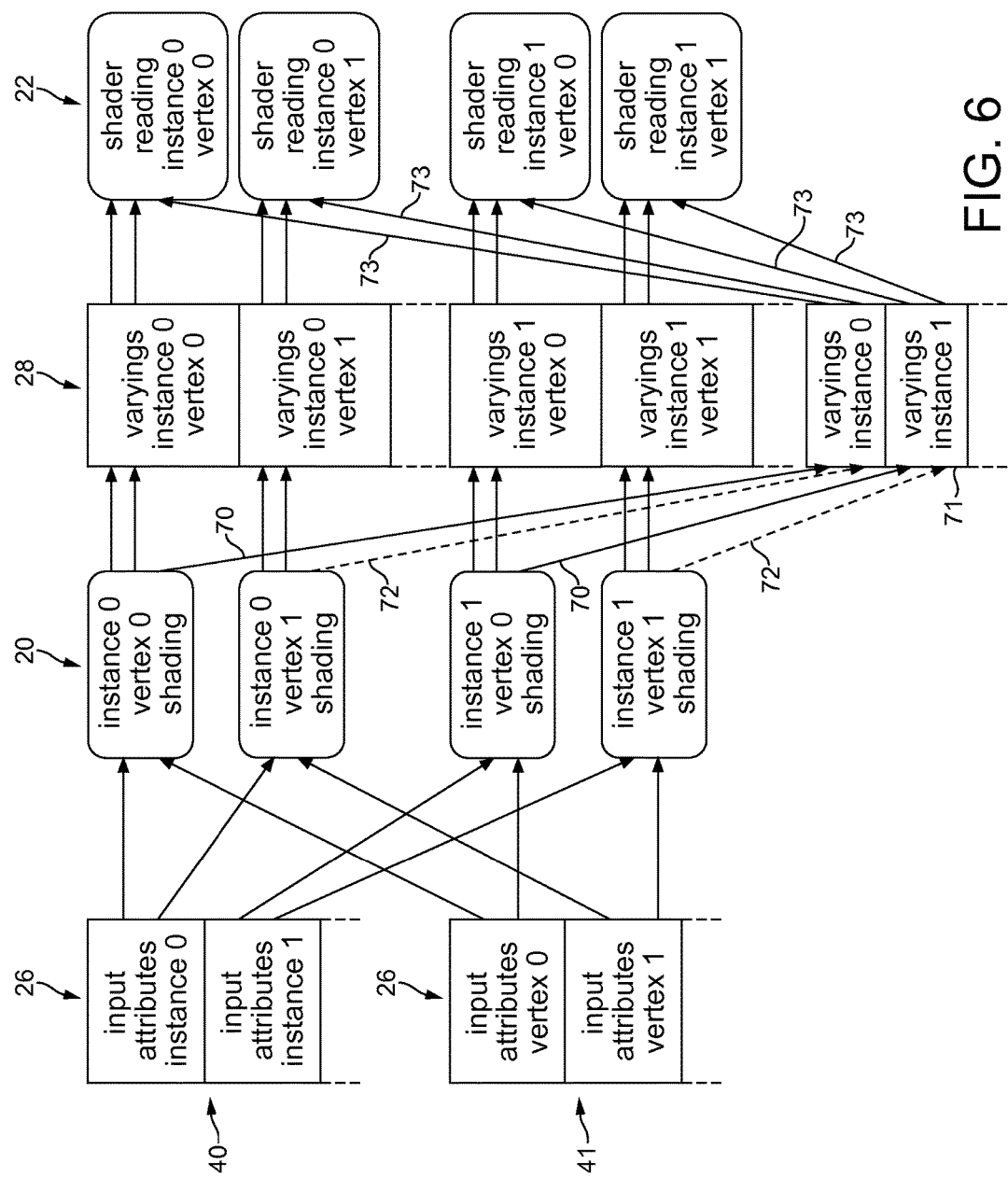

FIG. 6 shows the situation where there is a vertex shader output (secondary) attribute which depends only on per-instance defined vertex shader input attributes. In this case, as shown in FIG. 6, the vertex shader 20 writes a copy of the relevant output attribute value to the appropriate buffer 71 of the secondary attribute array 28 as shown by the arrow 70 for vertex 0, but for other vertices where that per-instance input only dependent attribute is also to be processed, the vertex shader 20 does not store a corresponding output value in the secondary attribute buffer 71 (as shown by the dashed line 72 in FIG. 6). In this way only one copy of the secondary attribute value is stored in the secondary attribute array 28.

Then, whenever the fragment shader 22 requires that per-instance input only dependent output attribute, it is directed, by means of the use of the appropriate secondary attribute descriptor, to read the appropriate single copy of the relevant output (secondary) attribute value in the buffer 71 of the secondary attribute array 28, as shown by the arrows 73 (using the divisor attribute mechanism described above).

Figure 7:
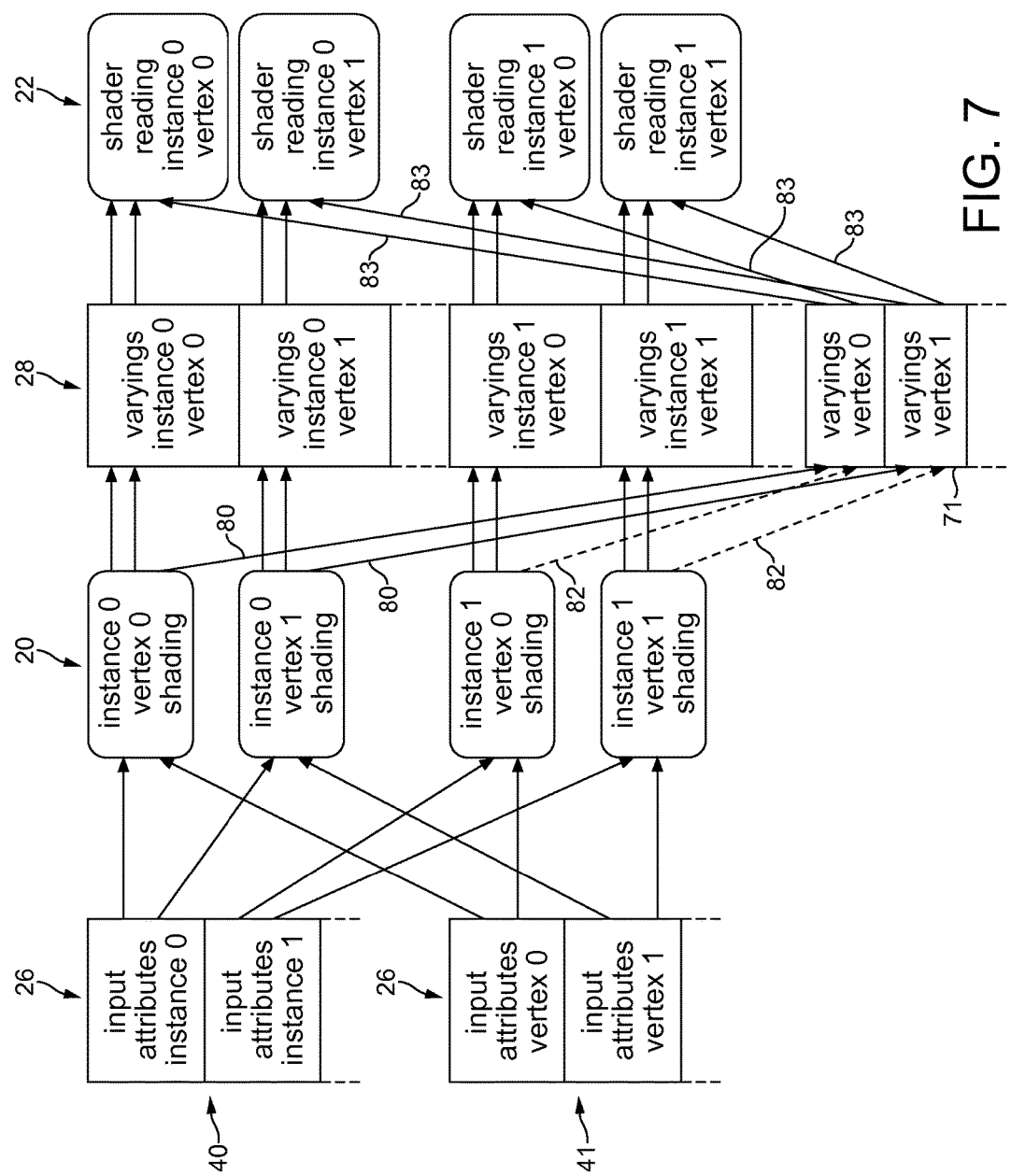

FIG. 7 shows the corresponding situation where there is a vertex shader output (secondary) attribute which depends only on per-vertex defined vertex shader input attributes. In this case, as shown in FIG. 7, the vertex shader 20 writes a copy of the relevant output attribute value to the appropriate buffer 71 of the secondary attribute array 28 as shown by the arrow 80 for instance 0, but for other instances where that per-vertex input only dependent attribute is also to be processed, the vertex shader 20 does not store a corresponding output value in the secondary attribute buffer 71 (as shown by the dashed line 82 in FIG. 7). In this way only one copy of the secondary attribute value is stored in the secondary attribute array 28.

Then, whenever the fragment shader 22 requires that per-vertex input only dependent output attribute, it is directed, by means of the use of the appropriate secondary attribute descriptor, to read the appropriate single copy of the relevant output (secondary) attribute value in the buffer 71 of the secondary attribute array 28, as shown by the arrows 83 (using the modulus attribute mechanism described above).

The above FIGS. 2A to 7 show the basic modes of operation of the present embodiment. In general, the vertex shader output (secondary) attributes can be any combination of the five different cases shown above (normal, per-vertex pass-through, per-instance pass-through, per-vertex write reduced or per-instance write reduced).

There is also a sixth case, where the output (secondary) attribute is a constant. In this case, each required copy of the constant secondary attribute could be stored as a separate secondary attribute value. Alternatively, a buffer with a space for just one value, and a modulus attribute type with a modulus value of 1 (and write reduction) could be used to allow (and cause) only one copy of the constant secondary attribute value to be stored (in this case only the vertex 0/instance 0 thread would store the constant value).

Although in the present embodiment the primary and secondary attribute and attribute descriptor arrays, etc., have been shown as being separate arrays, it will be appreciated by those skilled in the art that such an arrangement is not essential, and so long as the appropriate attribute descriptors and attribute values can be identified and retrieved in use, the actual arrangement for storing those data elements in memory can be as desired. For example, there could be a single attribute descriptor array that stores both the input and output (primary and secondary) attribute descriptors. Equally, the various attribute descriptors and attribute values and arrays may all be stored in the same memory or in different memories, may be cached, at least in part, etc., as desired.

It can be seen from the above that the technology described herein, in some embodiments at least, provides a mechanism to reduce memory traffic and memory usage (and thus power usage) for a vertex shader core in a graphics processing system.

This is achieved in some embodiments of the technology described herein at least by identifying those vertex shader outputs for which the vertex shader input attributes on which they depend are defined solely on a per-vertex or solely on a per-instance basis (i.e. those vertex shader outputs that are dependent on per-vertex only defined vertex shader input attributes or on per-instance only defined vertex shader input attributes), and where such outputs are identified, only storing one copy of each value of those outputs, and configuring the system such that subsequent graphics processing stages, such as the fragment shader, will reuse the single copy of the output value each different time that output value would be required.

In an embodiment, it is also detected when vertex shader outputs are copied directly from vertex shader inputs, and in that situation, the copy output value is not generated and stored in memory, but instead further stages of the graphics pipeline, such as the fragment shader, are configured to access the vertex shader input values directly.

What is claimed is:

1. A method of operating a graphics processing system that includes a vertex shading stage which processes values of input attributes to the vertex shading stage to generate values of output attributes of the vertex shading stage for use by a subsequent stage or stages of the graphics processing system, the method comprising:

the graphics processing system associating with one or more of the input and output attributes of the vertex shading stage, meta-information to be used when loading or storing values of the one or more input and output attributes, wherein the meta-information indicates a technique to use for, and any data necessary for, deriving from indices associated with values of the one or more input and output attributes, derived indices to be used to load or store the values of the one or more input and output attributes; and a graphics processing stage of the graphics processing system, when it is to load or store a value of an attribute of the one or more input and output attributes:

reading the meta-information associated with the attribute, wherein the meta-information indicates an attribute type, wherein the attribute type is a linear, divisor or modulus attribute;

determining a technique to use for, and any data necessary for, deriving from an index associated with the value of the attribute, a derived index to be used to load or store the value of the attribute using the read meta-information;

deriving from the index associated with the value of the attribute, the derived index to be used to load or store the value of the attribute using the determined technique and any data; and loading or storing the value of the attribute using the derived index.

2. The method of claim 1, wherein the meta-information associated with the attribute indicates a base memory address for values of the attribute.

3. The method of claim 2, further comprising the graphics processing stage of the graphics processing system deriving from the derived index to be used to load or store the value of the attribute and the base memory address by processing circuitry a memory address to use to load or store the value of the attribute.

4. The method of claim 1, wherein the meta-information associated with the attribute indicates one or more of:

an indication of a spacing of values of the attribute in memory; an indication of a position of the values of the attribute relative to a base memory address; and a storage "type" indicator for the values of the attribute, the storage "type" indicator indicating a component data type and number of components for the attribute.

5. The method of claim 1, wherein in a case that the attribute is an output attribute of the vertex shading stage, the meta-information associated with attribute indicates whether the vertex shading stage should determine whether to write the value of the attribute to memory or not.

6. The method of claim 1, wherein in a case that the attribute is an output attribute of the vertex shading stage, the meta-information associated with the attribute indicates a form that a test for determining whether the value of the attribute should be written to memory or not should take and any parameters needed for the test.

7. The method of claim 1, wherein in a case that the meta-information associated with the attribute indicates a divisor attribute type, a division operation is used to derive the derived index to be used to load or store the value of the attribute, and in a case that the meta-information associated with the attribute indicates a modulus attribute type, a modulo operation is used to derive the derived index to be used to load or store the value of the attribute.

8. The method of claim 7, wherein in the case that the meta-information associated with the attribute indicates a divisor attribute type, the meta-information also indicates a divisor value to be used to derive the derived index to be used to load or store the value of the attribute using the division operation, and in the case that the meta-information associated with the attribute indicates a modulus attribute type, the meta-information also indicates a modulo value to be used to derive the derived index to be used to load or store the value of the attribute using the modulo operation.

9. A non-transitory computer readable storage medium storing computer software code which when executing on one or more processors performs a method of operating a graphics processing system that includes a vertex shading stage which processes values of input attributes to the vertex shading stage to generate values of output attributes of the vertex shading stage for use by a subsequent stage or stages of the graphics processing system, the method comprising:

the graphics processing system associating with one or more of the input and output attributes of the vertex shading stage, meta-information to be used when loading or storing values of the one or more input and output attributes, wherein the meta-information indicates a technique to use for, and any data necessary for, deriving from indices associated with values of the one or more input and output attributes, derived indices to be used to load or store the values of the one or more input and output attributes; and a graphics processing stage of the graphics processing system, when it is to load or store a value of an attribute of the one or more input and output attributes:

reading the meta-information associated with the attribute, wherein the meta-information indicates an attribute type, wherein the attribute type is a linear, divisor or modulus attribute;

determining a technique to use for, and any data necessary for, deriving from an index associated with the value of the attribute, a derived index to be used to load or store the value of the attribute using the read meta-information;

deriving from the index associated with the value of the attribute, the derived index to be used to load or store the value of the attribute using the determined technique and any data; and loading or storing the value of the attribute using the derived index.

10. A graphics processing system comprising:

a plurality of graphics processing stages, including a vertex shading stage and at least one processing stage that is subsequent to the vertex shading stage and that will process outputs of the vertex shading stage; wherein:

the vertex shading stage processes values of input attributes to the vertex shading stage to generate values of output attributes of the vertex shading stage for use by subsequent stages of the graphics processing system; and the graphics processing system associates with one or more of the input and output attributes of the vertex shading stage, meta-information to be used when loading or storing values of the one or more input and output attributes, wherein the meta-information indicates a technique to use for, and any data necessary for, deriving from indices associated with values of the one or more input and output attributes, derived indices to be used to load or store the values of the one or more input and output attributes; and wherein:

one or more of the graphics processing stages of the graphics processing system, when it is to load or store a value of an attribute of the one or more input and output attributes:

reads the meta-information associated with the attribute, wherein the meta-information indicates an attribute type, wherein the attribute type is a linear, divisor or modulus attribute;

determines a technique to use for, and any data necessary for, deriving from an index associated with the value of the attribute, a derived index to be used to load or store the value of the attribute using the read meta-information;

derives from the index associated with the value of the attribute, the derived index to be used to load or store the value of the attribute using the determined technique and any data; and loads or stores the value of the attribute using the derived index.

11. The system of claim 10, wherein the meta-information associated with the attribute indicates a base memory address for values of the attribute.

12. The system of claim 11, wherein the one or more of the graphics processing stages of the graphics processing system derives from the derived index to be used to load or store the value of the attribute and the base memory address a memory address to use to load or store the value of the attribute.

13. The system of claim 10, wherein the meta-information associated with the attribute indicates one or more of:
an indication of a spacing of values of the attribute in memory; an indication of a position of the values of the attribute relative to a base memory address; and a storage "type" indicator for the values of the attribute, the storage "type" indicator indicating a component data type and number of components for the attribute.

14. The system of claim 10, wherein in a case that the attribute is an output attribute of the vertex shading stage, the meta-information associated with the attribute indicates whether the vertex shading stage should determine whether to write the value of the attribute to memory or not.

15. The system of claim 10, wherein in a case that the attribute is an output attribute of the vertex shading stage, the meta-information associated with the attribute indicates a form that a test for determining whether the value of the attribute should be written to memory or not should take and any parameters needed for the test.

16. The system of claim 10, wherein in a case that the meta-information associated with the attribute indicates a divisor attribute type, a division operation is used to derive the derived index to be used to load or store the value of the attribute, and in a case that the meta-information associated with the attribute indicates a modulus attribute type, a modulo operation is used to derive the derived index to be used to load or store the value of the attribute.

17. The system of claim 16, wherein in the case that the meta-information associated with the attribute indicates a divisor attribute type, the meta-information also indicates a divisor value to be used to derive the derived index to be used to load or store the value of the attribute using the division operation, and in the case that the meta-information associated with the attribute indicates a modulus attribute type, the meta-information also indicates a modulo value to be used to derive the derived index to be used to load or store the value of the attribute using the modulo operation.

* * * * *